US012623354B2

(12) United States Patent
Masuda et al.

(10) Patent No.: US 12,623,354 B2
(45) Date of Patent: May 12, 2026

(54) POSITIONING METHOD AND POSITIONING DEVICE

(71) Applicants: AISIN SHIROKI CORPORATION, Fujisawa (JP); TAMADIC Co., Ltd., Tokyo (JP); Shinya Hirano, Nisshin (JP); TACT SYSTEM Co., Ltd., Komaki (JP)

(72) Inventors: Jun Masuda, Kanagawa (JP); Kenji Shimizu, Kanagawa (JP); Yuji Mori, Kanagawa (JP); Hisao Hishikawa, Kanagawa (JP); Naofumi Matsushita, Kanagawa (JP); Shunsuke Tanaka, Kanagawa (JP); Yuki Inoue, Kanagawa (JP); Fuminori Imaizumi, Kanagawa (JP); Junya Nakamura, Kanagawa (JP); Tomokazu Uchiyama, Kanagawa (JP); Shinji Fujino, Tokyo (JP); Motohiro Kakureya, Tokyo (JP); Kohei Yagi, Tokyo (JP); Shinya Hirano, Aichi-ken (JP); Hitoshi Fujiyama, Aichi-ken (JP)

(73) Assignees: AISIN SHIROKI CORPORATION, Fujisawa (JP); Shinya Hirano, Nisshin (JP); TAMADIC CO., LTD., Tokyo (JP); TACT SYSTEM CO., LTD., Komaki (JP)

( * ) Notice: Subject to any disclaimer, the term of this patent is extended or adjusted under 35 U.S.C. 154(b) by 277 days.

(21) Appl. No.: 17/871,257

(22) Filed: Jul. 22, 2022

(65) Prior Publication Data

US 2023/0031819 A1     Feb. 2, 2023

(30) Foreign Application Priority Data

Jul. 30, 2021     (JP) ................................. 2021-125211

(51) Int. Cl.
    B25J 13/00     (2006.01)
    B25J 13/08     (2006.01)

(52) U.S. Cl.
    CPC ..................................... B25J 13/08 (2013.01)

(58) Field of Classification Search
    CPC ....................................................... B25J 13/08
    See application file for complete search history.

(56) References Cited

U.S. PATENT DOCUMENTS

| | | | |
|---|---|---|---|
| 6,193,142 B1 | 2/2001 | Segawa et al. | |
| 2005/0257361 A1* | 11/2005 | Ramnauth ............... | B23P 23/02 29/430 |

(Continued)

FOREIGN PATENT DOCUMENTS

| | | |
|---|---|---|
| JP | 10-249764 | 9/1998 |
| JP | 2005-537990 A | 12/2005 |

(Continued)

OTHER PUBLICATIONS

Office Action in Japanese Patent Application No. JP2021-125211, issued Oct. 29, 2024.

*Primary Examiner* — Wade Miles
*Assistant Examiner* — Aaron G Cain
(74) *Attorney, Agent, or Firm* — Finnegan, Henderson, Farabow, Garrett and Dunner, LLP

(57) ABSTRACT

There are provided a positioning method and a positioning device that can position workpieces by a simple method and configuration. A positioning method includes: gripping at least one of first and second workpieces; obtaining point group data of the at least one gripped workpiece of the first and second workpieces; calculating a translation matrix of shape fitting point group data obtained by adjusting a position of the point group data to reference data in a position adjustment state of the first and second workpieces; calculating an inverse matrix based on the translation (Continued)

matrix; and positioning the first and second workpieces by moving the at least one gripped workpiece of the first and second workpieces based on at least one of the translation matrix and the inverse matrix.

8 Claims, 16 Drawing Sheets

(56) References Cited

U.S. PATENT DOCUMENTS

| 2006/0015211 | A1 | | 1/2006 | Kolb et al. |
| 2010/0274390 | A1 | | 10/2010 | Walser et al. |
| 2017/0052534 | A1 | | 2/2017 | Ghanem |
| 2022/0274255 | A1* | | 9/2022 | Okawa .................. B25J 9/1697 |

FOREIGN PATENT DOCUMENTS

| JP | 5290324 | 9/2013 |
| WO | WO 2016/071996 A1 | 5/2016 |

* cited by examiner

RESULT OF MOVEMENT OBTAINED BY MATCHING THIS POINT GROUP WITH CAD CAN BE EXPRESSED BY MATRIX THAT INDICATES THAT ORIGIN HAS BEEN MOVED

RESULT OF MOVEMENT OBTAINED BY MATCHING THIS POINT GROUP WITH CAD CAN BE EXPRESSED BY MATRIX THAT INDICATES THAT ORIGIN HAS BEEN MOVED

MOVEMENT AMOUNT FOR MATCHING CAD WITH POINT GROUP IS CALCULATED BY PERFORMING INVERSE MATRIX TRANSFORMATION ON MATRIX OBTAINED FROM FIG. 6

MOVEMENT AMOUNT FOR MATCHING CAD WITH POINT GROUP IS CALCULATED BY PERFORMING INVERSE MATRIX TRANSFORMATION ON MATRIX OBTAINED FROM FIG. 6

WHEN SEEN FROM ORIGIN, STATE WHERE CAD AND POINT GROUP ARE MATCHED IS MOVED TO MATCH CAD COORDINATE WITH POINT GROUP

RETURN TO ORIGIN WHEN SEEN FROM SQUARE MATRIX

POINT GROUP IS MATCHED WITH CAD
→ SQUARE MATRIX

CAD IS MATCHED WITH POINT GROUP
→ INVERSE MATRIX

ST5
CALCULATE MOVEMENT AMOUNT OF CAD COORDINATE OF
COLUMN SASH → CAD COORDINATE OF UPPER SASH $$\begin{bmatrix} -0.767 & 0.515 & -0.511 & 2650 \\ -0.190 & 0.936 & -0.331 & -8450 \\ 0.786 & -0.037 & 0.392 & -7570 \\ 0 & 0 & 0 & 1 \end{bmatrix}$$

ST4'
GIVE CAD COORDINATE TO POINT
GROUP OF UPPER SASH

ST4
GIVE CAD COORDINATE TO POINT
GROUP OF COLUMN SASH

MARKER POSITION IS MEASURED AT TIME OF CALCULATION
POSITIONAL RELATIONSHIP BETWEEN TWO COORDINATES IS FOUND

MOVING COORDINATE BETWEEN TWO COORDINATES IS CALCULATED
MARKER TARGET POSITION IS ALSO CALCULATED AT THIS TIME

INVERSE MATRIX 4 × 4

INVERSE MATRIX 4 × 4

COORDINATES ARE GIVEN TO TWO ITEMS OF POINT GROUP DATA BY INVERSE MATRIX

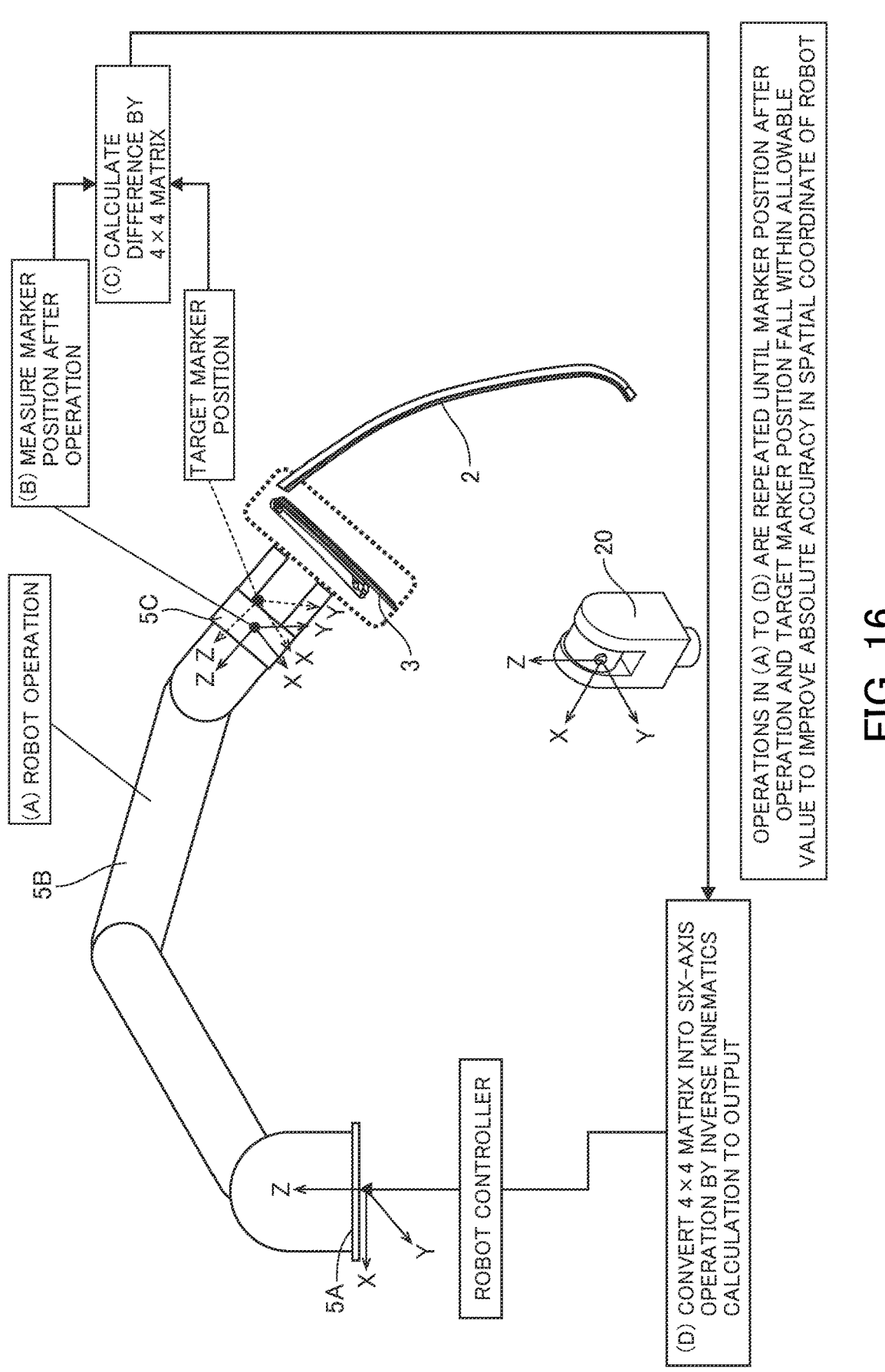

(B) MEASURE MARKER POSITION AFTER OPERATION (C) CALCULATE DIFFERENCE BY 4×4 MATRIX

TARGET MARKER POSITION (A) ROBOT OPERATION

ROBOT CONTROLLER (D) CONVERT 4×4 MATRIX INTO SIX-AXIS OPERATION BY INVERSE KINEMATICS CALCULATION TO OUTPUT

OPERATIONS IN (A) TO (D) ARE REPEATED UNTIL MARKER POSITION AFTER OPERATION AND TARGET MARKER POSITION FALL WITHIN ALLOWABLE VALUE TO IMPROVE ABSOLUTE ACCURACY IN SPATIAL COORDINATE OF ROBOT

FIG. 16

POSITIONING METHOD AND POSITIONING DEVICE

CROSS-REFERENCE TO RELATED APPLICATION

Field of the Invention

The present invention relates to a positioning method and a positioning device.

Background of the Invention

Conventionally, a technique that welds a workpiece with another workpiece while gripping the workpiece by an arm robot is known. In this case, a dedicated positioning mechanism (including a mold or a jig for positioning) is used to position not only the arm robot but also the workpiece gripped by the arm robot. However, the positioning mechanism needs to be separately provided, and therefore equipment cost is high and a wide equipment installation space is necessary. Moreover, positioning mechanisms the number of which corresponds to the number of car models are necessary, and, therefore when the number of car models is large, the number of times of set-up changes becomes large, and a total set-up change time becomes longer. Furthermore, every time a new car model is launched, a similar problem occurs.

JP 5290324 B2 discloses a method for positioning at least one object at a final posture in a space by an industrial robot. This method uses a first industrial robot, a first optical imaging device and at least one second optical imaging device to position the object. The first industrial robot can adjust the object to a predetermined position. The first optimal imaging device is calibrated in a three-dimensional spatial coordinate system, and is positioned at a known first position in a known direction. The second optimal imaging device is calibrated in the three-dimensional spatial coordinate system, and is positioned at a known second position in the known direction.

The first optical imaging device includes a first camera, a first driving unit, and a first angle measurement unit. The first camera is optically calibrated to capture an image in a predetermined first field of view. The first driving unit is a component that determines a direction of the first camera to adjust a position of the first field of view. The first angle measurement unit detects an angular direction of the first camera, and is calibrated in the spatial coordinate system for finding the first field of view in the spatial coordinate system.

The second optical imaging device includes a second camera, a second driving unit, and a second angle measurement unit. The second camera is optically calibrated to capture an image in a predetermined second field of view. The second driving unit is a component that determines a direction of the second camera to adjust a position of the second field of view. The second angle measurement unit detects an angular direction of the second camera, and is calibrated in the spatial coordinate system for finding the second field of view in the spatial coordinate system.

SUMMARY OF THE INVENTION

However, according to JP 5290324 B2, since devices required to position an object are large-scale (the first optical imaging device (the first camera, the first driving unit and the first angle measurement unit) and the second optical imaging device (the second camera, the second driving unit and the second angle measurement unit)), and it cannot be said that a positioning method of the devices is also simple, there has been a room for improvement.

The present invention has been made based on an awareness of the above-described problem, and an object of the present invention is to provide a positioning method and a positioning device that can position workpieces by a simple method and configuration.

A positioning method according to the present embodiment includes: gripping at least one of first and second workpieces; obtaining point group data of the at least one gripped workpiece of the first and second workpieces; calculating a translation matrix of shape fitting point group data obtained by adjusting a position of the point group data to reference data in a position adjustment state of the first and second workpieces; calculating an inverse matrix based on the translation matrix; and positioning the first and second workpieces by moving the at least one gripped workpiece of the first and second workpieces based on at least one of the translation matrix and the inverse matrix.

The positioning method may further include moving the shape fitting point group data based on the inverse matrix, moving an origin of the reference data together at a time of the movement, and matching moved origins of the first and second workpieces.

In the positioning of the first and second workpieces, the first and second workpieces may be positioned by giving an origin to the point group data by using the inverse matrix, calculating a movement amount for moving the one origin of the origins of the first workpiece and the second workpiece to the other origin, and moving the at least one gripped workpiece of the first and second workpieces based on the calculated movement amount.

The positioning method may further include obtaining the shape fitting point group data obtained by adjusting the position of the point group data to the reference data including the origin by using a position information generation device.

When the point group data is matched with the reference data, a necessary number of arbitrary positions on the reference data may be set as a reference, and a priority may be set to each set reference.

A grip part that grips at least one of the first and second workpieces may be configured as an arm robot that includes a plurality of axes, and includes a distal end part provided with a marker that makes it possible to monitor a position coordinate and an angle of the distal end part of the arm robot, and include a function of correcting an error of a difference between a current position and a target position of the marker at the distal end part of the arm robot by causing the plurality of axes of the arm robot to make multiple micromotions.

The multiple micromotions may include a function that can set coefficient adjustment of a micromotion amount and a number of times of the micromotions.

One of the first and second workpieces may be an upper sash, and other one of the first and second workpieces may be a column sash.

A positioning device according to the present embodiment includes: a grip part that grips at least one of first and second workpieces; a point group data obtaining section that obtains point group data of the at least one gripped workpiece of the first and second workpieces; a translation matrix operation section that calculates a translation matrix of shape fitting point group data obtained by adjusting a position of the point group data to reference data in a position adjustment state of the first and second workpieces; and an inverse matrix operation section that calculates an inverse matrix based on the translation matrix, and the grip part positions the first and second workpieces by moving the at least one gripped workpiece of the first and second workpieces based on at least one of the translation matrix and the inverse matrix.

The present invention can provide a positioning method and a positioning device that can position workpieces by a simple method and configuration.

BRIEF DESCRIPTION OF THE DRAWINGS

FIG. 16 is a view illustrating a third example of obtaining of the various items of data that uses the position information generation device, and the position adjustment operation based on the obtained items of data.

DESCRIPTION OF THE PREFERRED EMBODIMENTS

Figure 1:
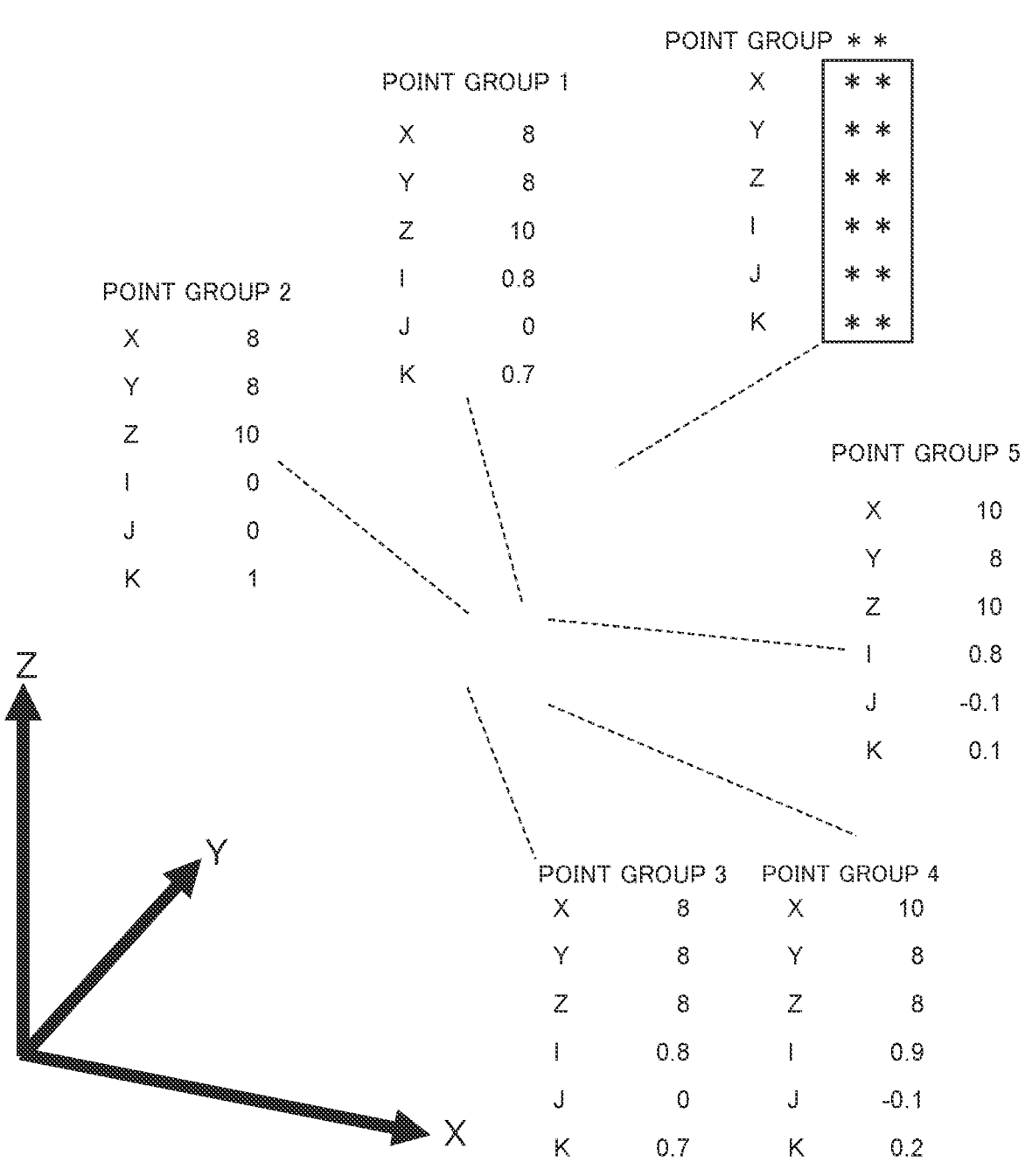
FIG. 1 is a view illustrating an example of an expression of each point information of point group data.

First, terms in this description are defined.

A "3D scanner" in this description is, for example, a device that obtains shape information of workpieces (first and second workpieces such as an upper sash and a column sash (pillar sash)) as point group data. Each point information of the point group data can be expressed as numerical values of coordinates X, Y and Z whose origins are a 3D scanner origin, and normal direction I, J and K of the coordinates X, Y and Z.

A "position information generation device" in this description is, for example, a device that can calculate three-dimensional information (position information and an angle) of a target based on an own coordinate system of the position information generation device. The "position information generation device" is, for example, a laser tracker that radiates laser light, and obtains three-dimensional position information of a target when the laser light reflected by the target returns to a light emission source. The "position information generation device" such as the laser tracker has a wide measurement range, so that, if there are the "position information generation device" and the target or a touch probe with a marker described later, it is possible to accurately calculate a dimension between each equipment, accuracy and an origin position.

The "marker" in this description is, for example, one type of a target for the position information generation device to obtain position coordinates and angles. The position coordinates and the angles of the "marker" are calculated by using the position information generation device as an origin. The position coordinates and the angles can be expressed as the coordinates X, Y and Z and angles Rx, Ry and Rz, and the angles Rx, Ry and Rz can be each expressed by 4×4 matrix data (matrix data) that uses unit vectors (I, J and K) of change amounts from a reference X axis, a reference Y axis and a reference Z axis, and movement amounts (X, Y and Z) from a reference point as described later. The "marker" is attached to, for example, a grip part at a distal end of a robot arm, and is used to obtain, as a numerical value, operation accuracy of the robot arm (an absolute position of the grip part on a three-dimensional space) that uses the position information generation device as the origin. In addition, the marker is additionally used widely for a touch probe with a marker for contacting and measuring a target workpiece as described later, or a type of a marker attached to a 3D scanner for measuring a target workpiece without contact. For any measurement information, the marker is used for arrangement at the position information generation device origin.

The "touch probe with the marker" in this description refers to, for example, a touch probe that can calculate a position of a target workpiece on a three-dimensional space that uses the position information generation device as the origin by making a probe distal end touch and measure the target workpiece in a state where the position information generation device locks onto a target part of the "touch probe with the marker".

The "3D scanner with the marker" in this description can calculate point group information obtained by the 3D scanner as the position information generation device origin from a marker origin coordinate/angle from the position information generation device origin and a 3D scanner origin coordinate/angle (described later) from a marker origin by 3D-scanning a target workpiece in a state where, for example, the position information generation device locks onto a target part of the "3D scanner with the marker". Position information of a reference block calculated by using the position information generation device and the touch probe with the marker, and position information of the reference block captured by the 3D scanner are matched (calibrated) at a time of setting of a relationship between the marker origin position and the 3D scanner origin position to calculate a 3D scanner origin/angle information. Generally, 3D scanners have characteristics that accuracy lowers when an image capturing range is widened, and therefore is not suitable for capturing images in a wide range, and a 3D scanner alone has a limitation for an operation of entire equipment described later. Therefore, a measure to use the position information generation device is taken to widen the image capturing range and a measurement range.

"Point group data" in this description means, for example, three-dimensional information of workpieces obtained by 3D-scanning the workpieces (the first and second workpieces such as the upper sash and the column sash) (by capturing images of the workpieces) using a device such as a 3D scanner (camera). Furthermore, each point information of the point group data can be expressed as, for example, numerical values of the coordinates X, Y, Z and the normal directions I, J, and K of the coordinates X, Y, Z (FIG. 1) as illustrated in, for example, FIG. 1. In an example in FIG. 1, a point group 1, a point group 2, a point group 3, a point group 4, a point group 5 and a point group ** are shown.

"Reference data" in this description means, for example, data (e.g., masterwork data, design value data, raw data or CAD data) that serves as a reference for design of the workpieces (the first and second work such as the upper sash and the column sash).

"Shape fitting point group data" in this description means point group data obtained by matching the above-described "point group data" with the "reference data".

Figure 2:
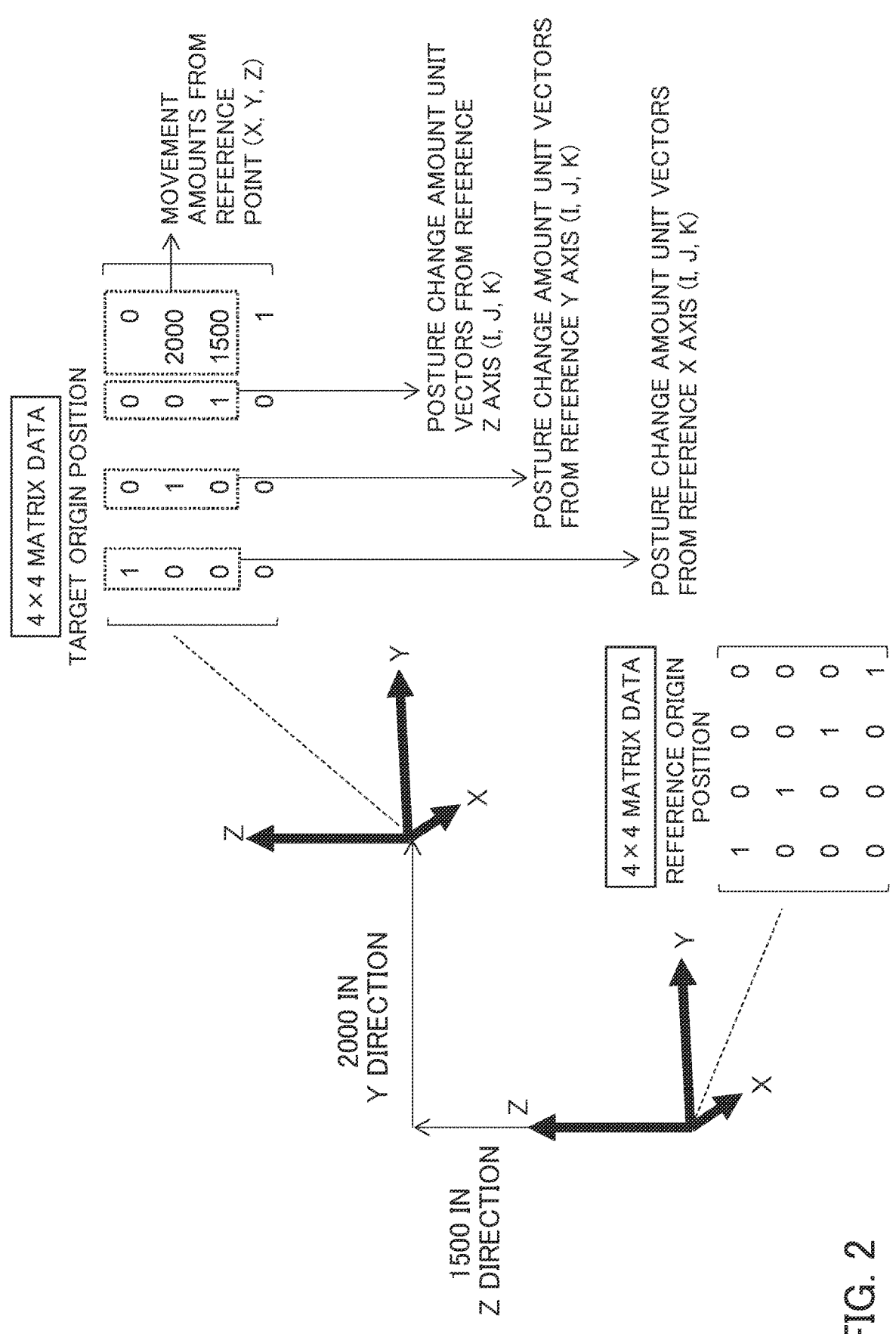
FIG. 2 is a view illustrating an example of an expression of an origin in a 4×4 matrix.

A "translation matrix" and an "inverse matrix" in this description are expressed by, for example, 4×4 matrix data (matrix data). As illustrated in, for example, FIG. 2, the "translation matrix" and the "inverse matrix" are expressed as information of the origin or a position from a reference origin to a certain target origin. A first column from the left indicates unit vectors (I, J, K) of a posture change amount from the reference X axis, a second column from the left indicates unit vectors (I, J, K) of the posture change amount from the reference Y axis, a third column from the left indicates unit vectors (I, J, K) of the posture change amount from the reference Z axis, and a fourth column from the left indicates movement amounts (X, Y, Z) from the reference point.

Figure 3:
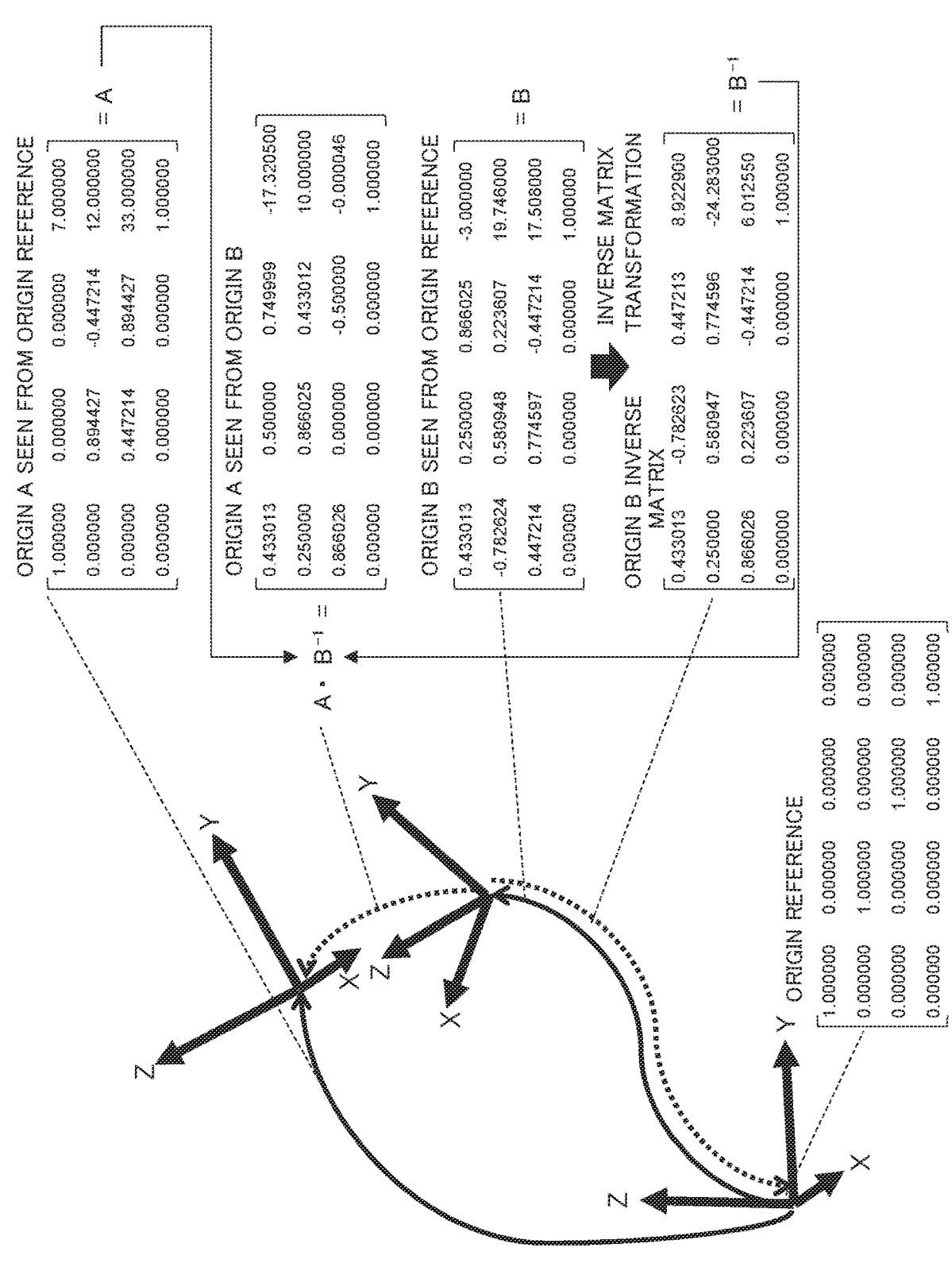
FIG. 3 is a view illustrating an example of origin calculation that uses the 4×4 matrix.

By using the matrix, it is possible to calculate the movement amount of each coordinate as illustrated in FIG. 3. By performing this matrix calculation, it is possible to calculate a quantity of a position/angle of each coordinate system. Movement for matching the above-described point group data with the reference data can be also expressed by 4×4 matrix data. Furthermore, by performing inverse matrix transformation on this 4×4 matrix data, it is also possible to output the 4×4 matrix data of the movement for matching the reference data with the point group data. In FIG. 3, an origin reference, an origin A seen from the origin reference, the origin A seen from an origin B, the origin B seen from the origin reference and an inverse matrix of the origin B are each expressed by 4×4 matrix data.

Figure 4:
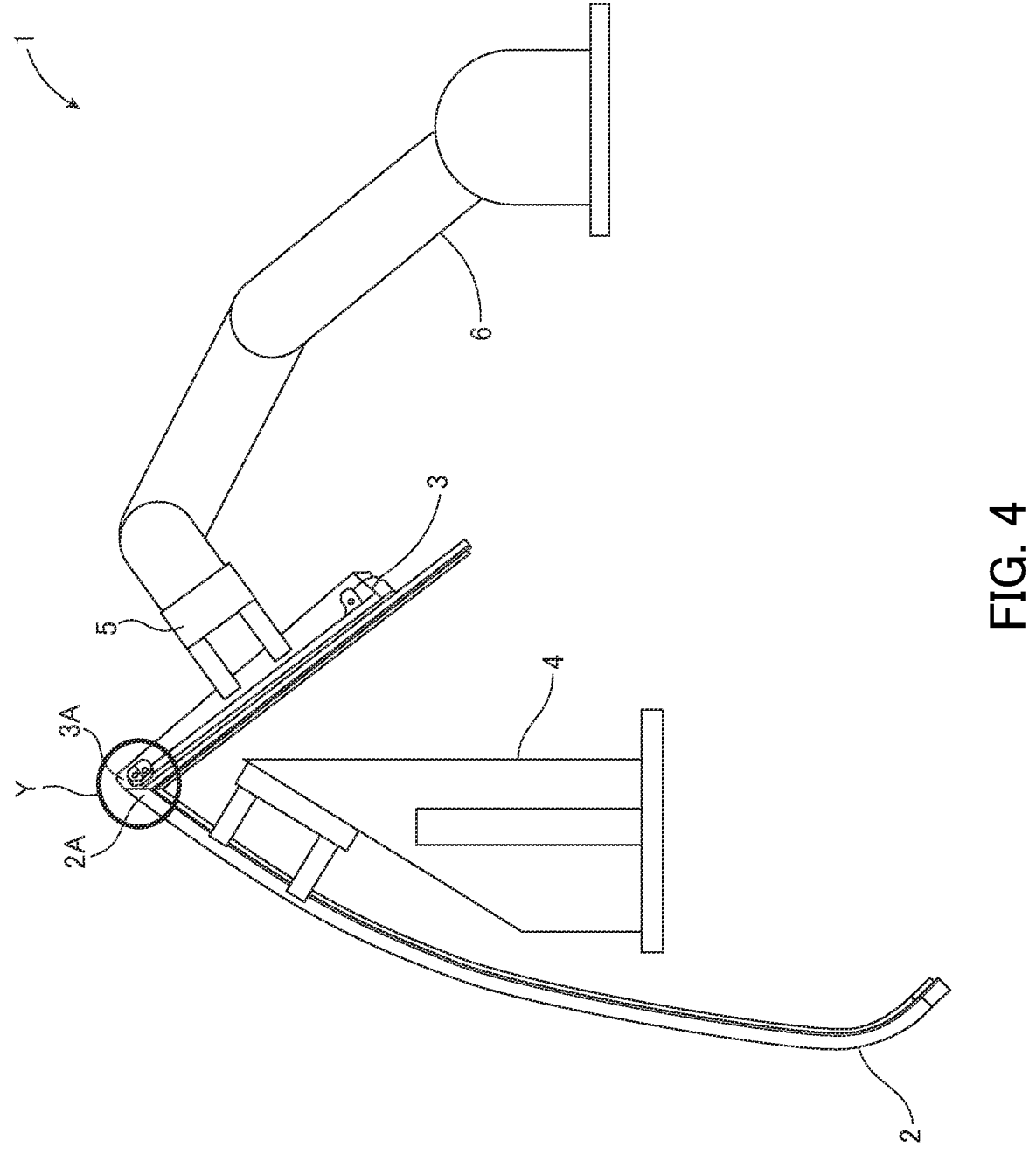
FIG. 4 is a view illustrating a first example of a configuration of a welding device of vehicle parts to which a positioning device according to the present embodiment is applied.

FIG. 4 is a view illustrating a first example of a configuration of a welding device 1 of vehicle parts to which a positioning device (positioning method) according to the present embodiment is applied. The welding device 1 welds an end part 2A of an upper sash (front main frame) 2 and an end part 3A of a column sash (front column frame) 3 in a position adjustment state. In FIG. 4, welded parts (corner parts) of the end part 2A of the upper sash 2 and the end part 3A of the column sash 3 are encircled by a bold circle and assigned a symbol Y. One and other one of the upper sash 2 and the column sash 3 correspond to the "first workpiece" and the "second workpiece". Hereinafter, the embodiment will be described as an example assuming that the upper sash 2 corresponds to the "first workpiece" and the column sash 3 corresponds to the "second workpiece".

The upper sash 2 is fixed to a fixing jig (e.g., a jig of a tact system) 4. In this case, a relative positional relationship between the upper sash 2 and the fixing jig 4 may change every time a workpiece is attached or detached, and therefore a repeatedly positioning function required for normal jigs is unnecessary (because a workpiece attachment position of the upper sash 2 is calculated by an inverse matrix described later). Therefore, the fixing jig 4 may fix any position of the workpiece. The column sash 3 is gripped by a grip part (e.g., a hand of the tact system) 5 of a robot arm part 6. In this case, a relative positional relationship between the column sash 3 and the grip part 5 may change every time the workpiece is attached or detached, and therefore a repeatedly positioning function required for normal jigs is unnecessary (because a workpiece grip position of the column sash 3 is calculated by an inverse matrix described later). Therefore, the grip part 5 of the robot arm part 6 may grip any position of the workpiece. The robot arm part 6 includes, for example, an arm robot that includes a plurality of axes (e.g., six axes), and works (moves) to adjust to the end part 2A of the upper sash 2 a position of the end part 3A of the column sash 3 gripped by the grip part 5 at a distal end part of the robot arm part 6. This system secures relative position accuracy of the upper sash 2 and the fixing jig 4 and relative position accuracy of the column sash 3 and the grip part 5, and a device (e.g., a machine tool such as a machining center) that secures absolute positioning accuracy of a robot spatial coordinate can perform accurate positioning.

Figure 5:
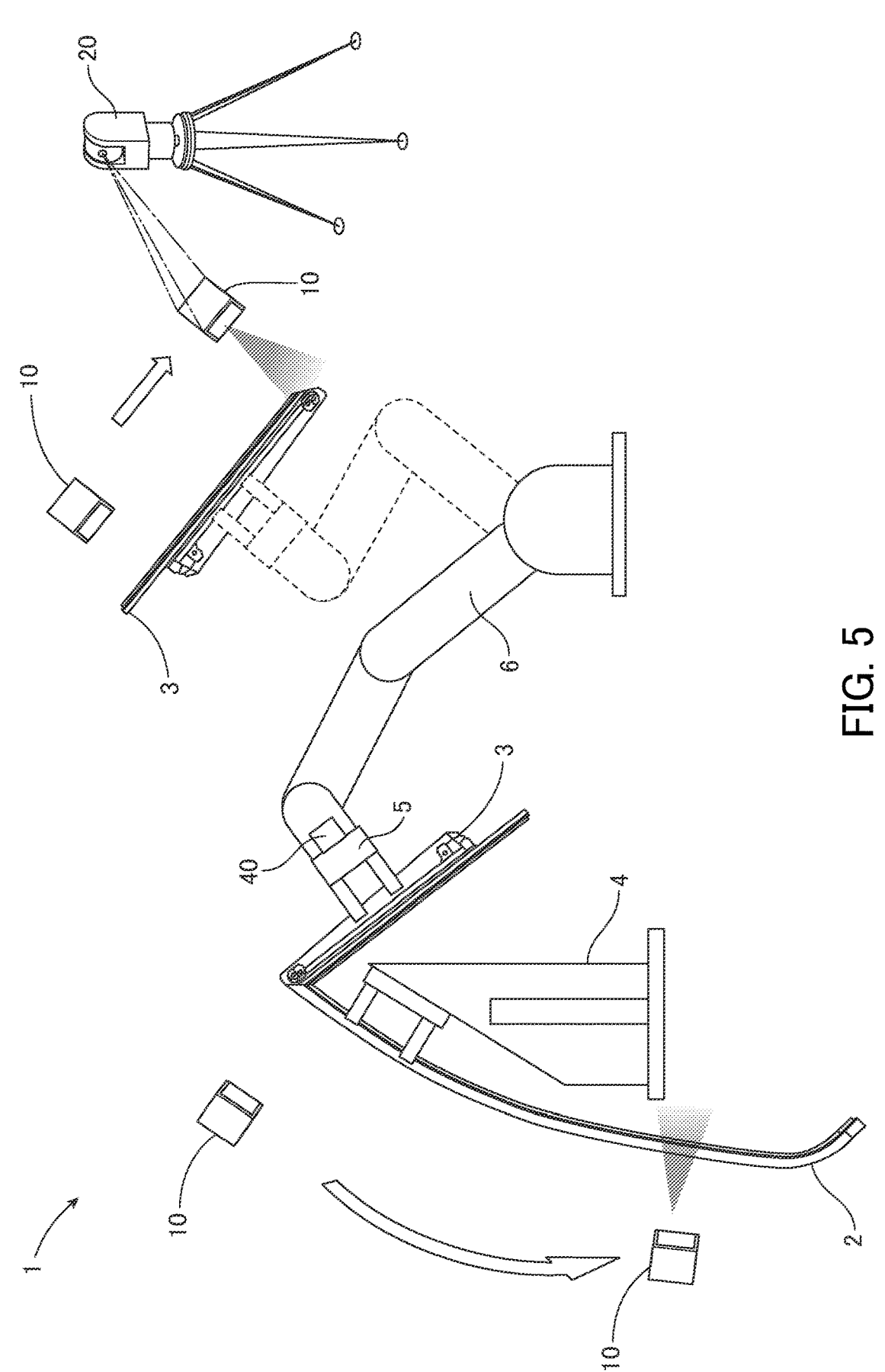
FIG. 5 is a view illustrating a second example of the configuration of the welding device of the vehicle parts to which the positioning device according to the present embodiment is applied.

FIG. 5 is a view illustrating a second example of the configuration of the welding device 1 of the vehicle parts to which the positioning device (positioning method) according to the present embodiment is applied. The positioning device (positioning method) according to the present embodiment obtains point group data (three-dimensional information) of the upper sash 2 and the column sash 3 by 3D-scanning the upper sash 2 and the column sash 3 (by capturing images of the upper sash 2 and the column sash 3 while moving the upper sash 2 and the column sash 3 in an arrow direction in FIG. 5) using a 3D scanner (camera) 10 with a marker. That is, the 3D scanner 10 with the marker functions as a "point group data obtaining section". Furthermore, by obtaining point groups in a state where a position information generation device (laser tracker) 20 locks onto the 3D scanner 10 with the marker, the point group data obtained by the 3D scanner 10 with the marker is calculated using the position information generation device 20 as an origin. This point group data is expressed as, for example, the coordinates X, Y and Z of each point and the normal direction I, J and K of the coordinates X, Y and Z, and an origin of the point group data is expressed by 4×4 matrix data (matrix data) (details will be described later).

In this regard, when the point group data is obtained, part of the upper sash 2 and the column sash 3 such as only a part that serves as a reference for product evaluation may be 3D-scanned instead of 3D-scanning the entire upper sash 2 and column sash 3. This 3D scan may adopt a scheme that obtains a point group while moving a 2D scanner, a scheme that positions a 3D scanner to perform scanning, or a scheme that installs fixed 3D scanners at a plurality of portions to perform scanning. As described later, it is possible to set a necessary number of arbitrary positions on reference data, and adjust the positions when point group data is matched with reference data. Furthermore, it is possible to set a priority to each reference, and prioritize position adjustment of a more important portion. Consequently, it is possible to control a position adjustment scheme of the reference data and the point group data. According to the present embodiment, when an error amount of each reference part is great, the welded parts of the upper sash 2 and the column sash 3 are likely to interfere with each other, so that it is possible to position the upper sash 2 and the column sash 3 prioritizing fitting of shapes of the welded parts by setting a high priority to the welded parts compared to other reference parts.

Furthermore, the positioning device (positioning method) according to the present embodiment arranges (prepares) reference data (e.g., CAD data) that serves as a reference for design of the upper sash 2 and the column sash 3 in advance. This reference data can include an origin (such as a vehicle origin and, in this case, vehicle origin=position information generation device origin), and can be data of a position adjustment state of the upper sash 2 and the column sash 3. Furthermore, the positioning device (positioning method) according to the present embodiment calculates shape fitting point group data obtained by adjusting the position of point group data to reference data including the origin (vehicle origin) using a control section described later. Furthermore, a movement amount of movement of the point group data to the reference data, and the origins of the reference data and the shape fitting point group data are expressed by 4×4 matrix data (matrix data) (details will described later).

Figure 6:
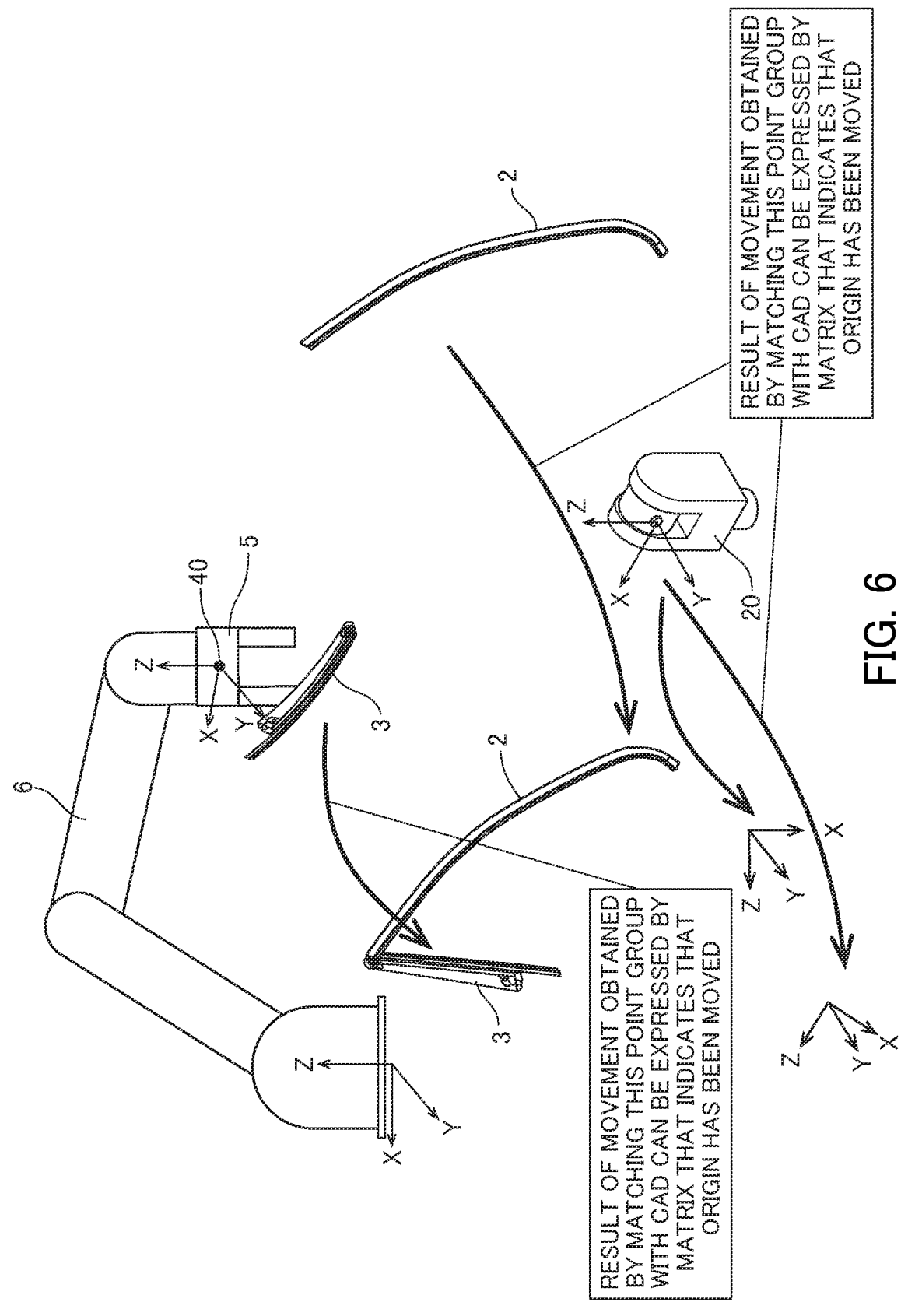
FIG. 6 is a view illustrating an example where all coordinate systems are arranged in a laser tracker coordinate system at a time of a square matrix.
Figure 7:
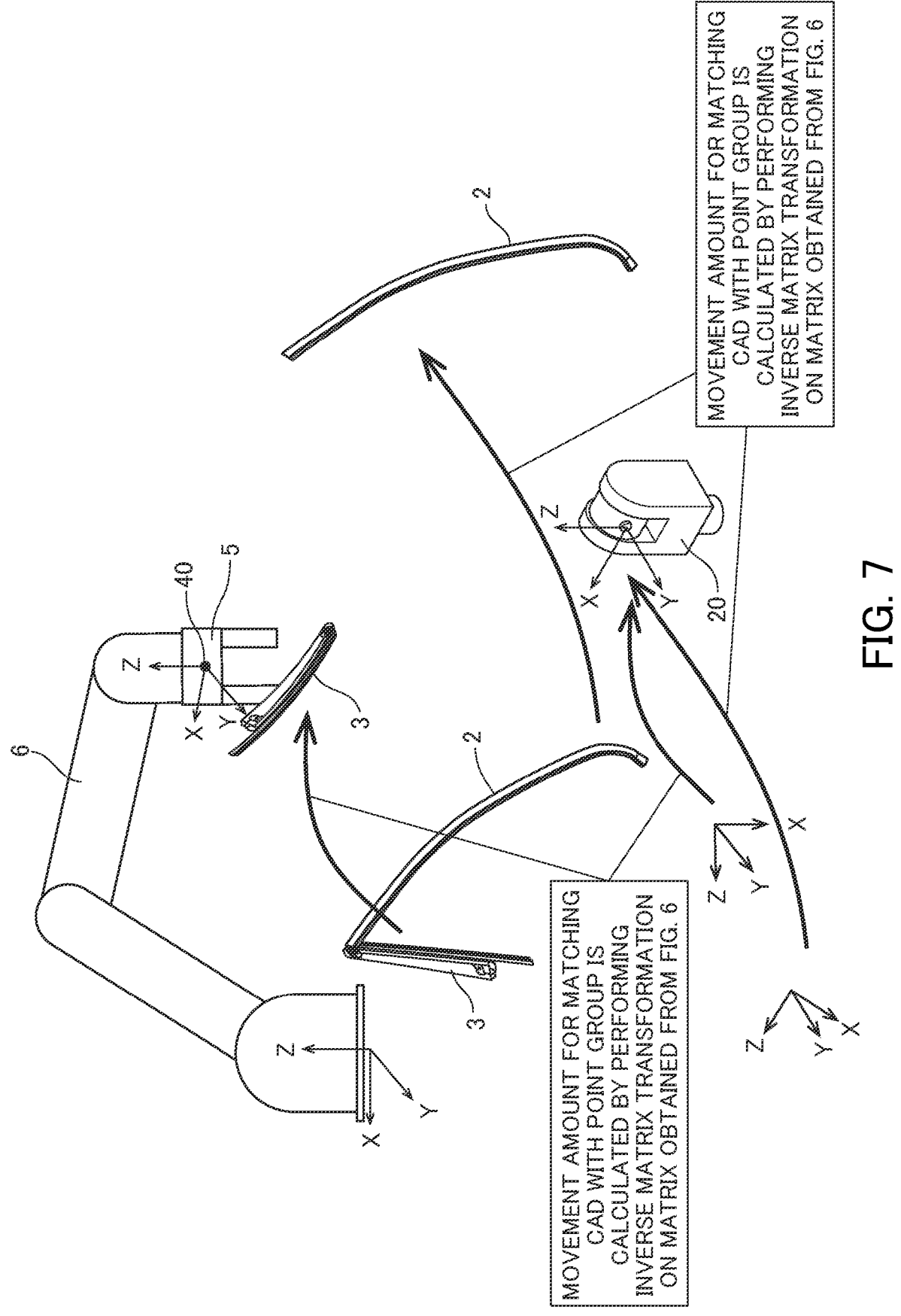
FIG. 7 is a view illustrating a first example where all coordinate systems are arranged in the laser tracker coordinate system at a time of an inverse matrix.
Figure 8:
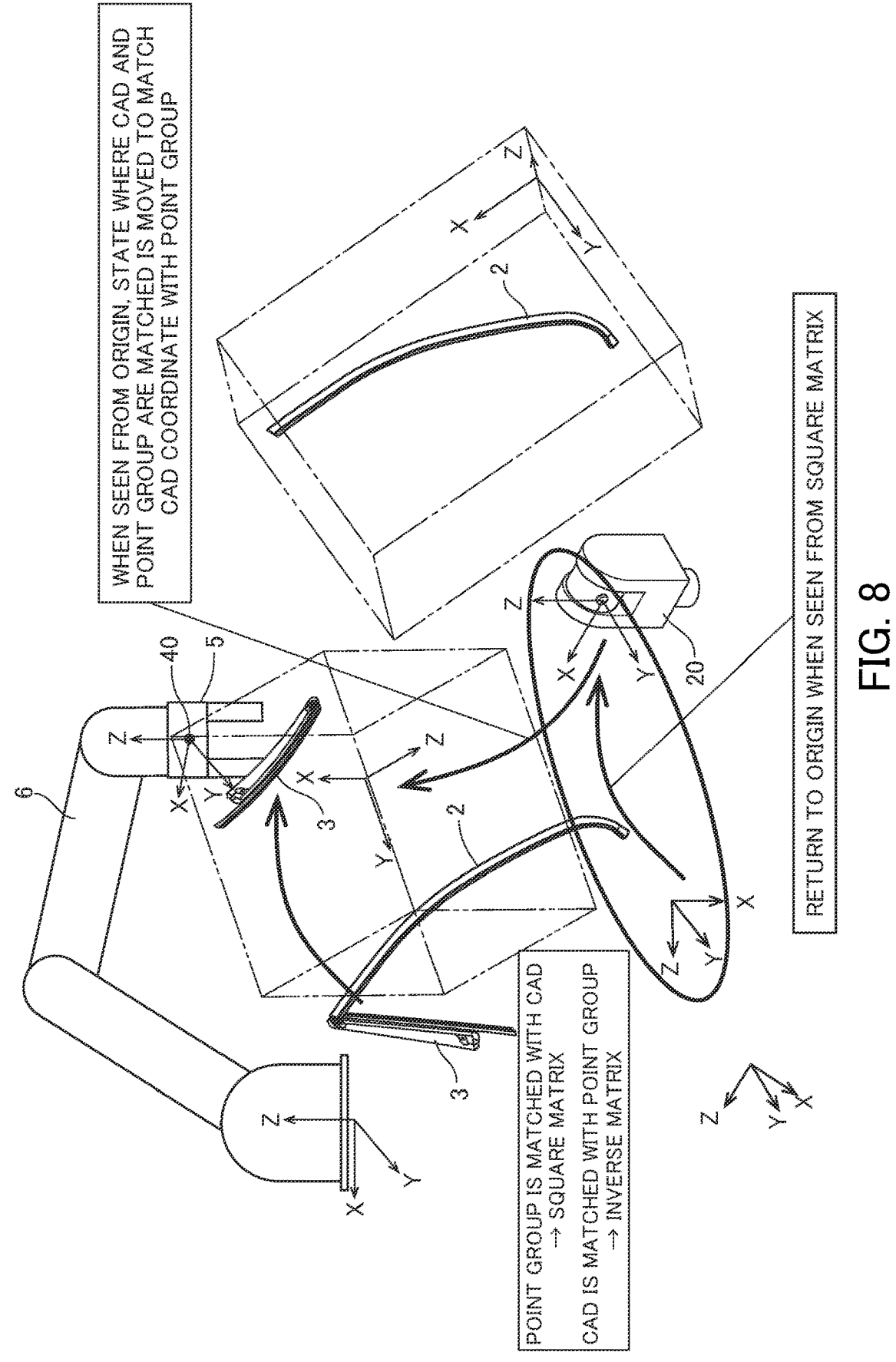
FIG. 8 is a view illustrating a second example where all coordinate systems are arranged in the laser tracker coordinate system at a time of an inverse matrix.

The origin coordinate of the shape fitting point group data is the same as a coordinate obtained by moving the origin of the point group data obtained at the position information generation device origin, and therefore is an origin position illustrated in FIG. 6. Performing inverse matrix transformation on the 4×4 matrix data (matrix) for matching the point group data with this reference data is the same as matching the reference data with the point group data, and therefore gives the origin to the point group data as illustrated in FIGS. 7 and 8 (a state of the shape fitting point group data expressed as a reference data origin is expressed as a point group data reference). This scheme realizes giving CAD origin information to point group data without an origin.

As illustrated in FIG. 6, a result of movement for matching the point group data of the upper sash 2 and the column sash 3 with CAD data (reference data) can be expressed by (that is, is equivalent to) a matrix that indicates that the origin has been moved. As illustrated in FIG. 7, the matrix obtained from FIG. 6 is transformed into an inverse matrix to calculate a movement amount for matching the CAD data (reference data) with the point group data. As illustrated in FIG. 8, matching the point group data with the CAD data (reference data) corresponds to a square matrix, and matching the CAD data (reference data) with the point group data corresponds to the inverse matrix (which corresponds to returning to the origin when seen from the square matrix). That is, when seen from the origin, a state where the CAD data (reference data) and the point group data are matched is moved to match the CAD coordinate with the point group data. In a case where actual workpiece arrangement of the upper sash 2 can be reproduced at a position as indicated in the CAD coordinate system, the position of the upper sash 2 is known, so that it is possible to calculate a movement amount between the origins only by calculating a matrix of the column sash 3 (in this case, inverse matrix transformation is unnecessary).

The distal end part (the grip part 5 or a vicinity thereof) of the robot arm part 6 is provided with a marker 40. The position information generation device 20 assists position adjustment (micro driving) of not only the grip part 5 but also a workpiece (the column sash 3 in this case) gripped by the grip part 5 by monitoring (continuing tracking) at all times a position of the marker 40 provided at the distal end part of the robot arm part 6. The robot arm part 6 is calibrated in advance by the position information generation device 20 and the marker 40 to improve absolute accuracy in a spatial coordinate.

Figure 9:
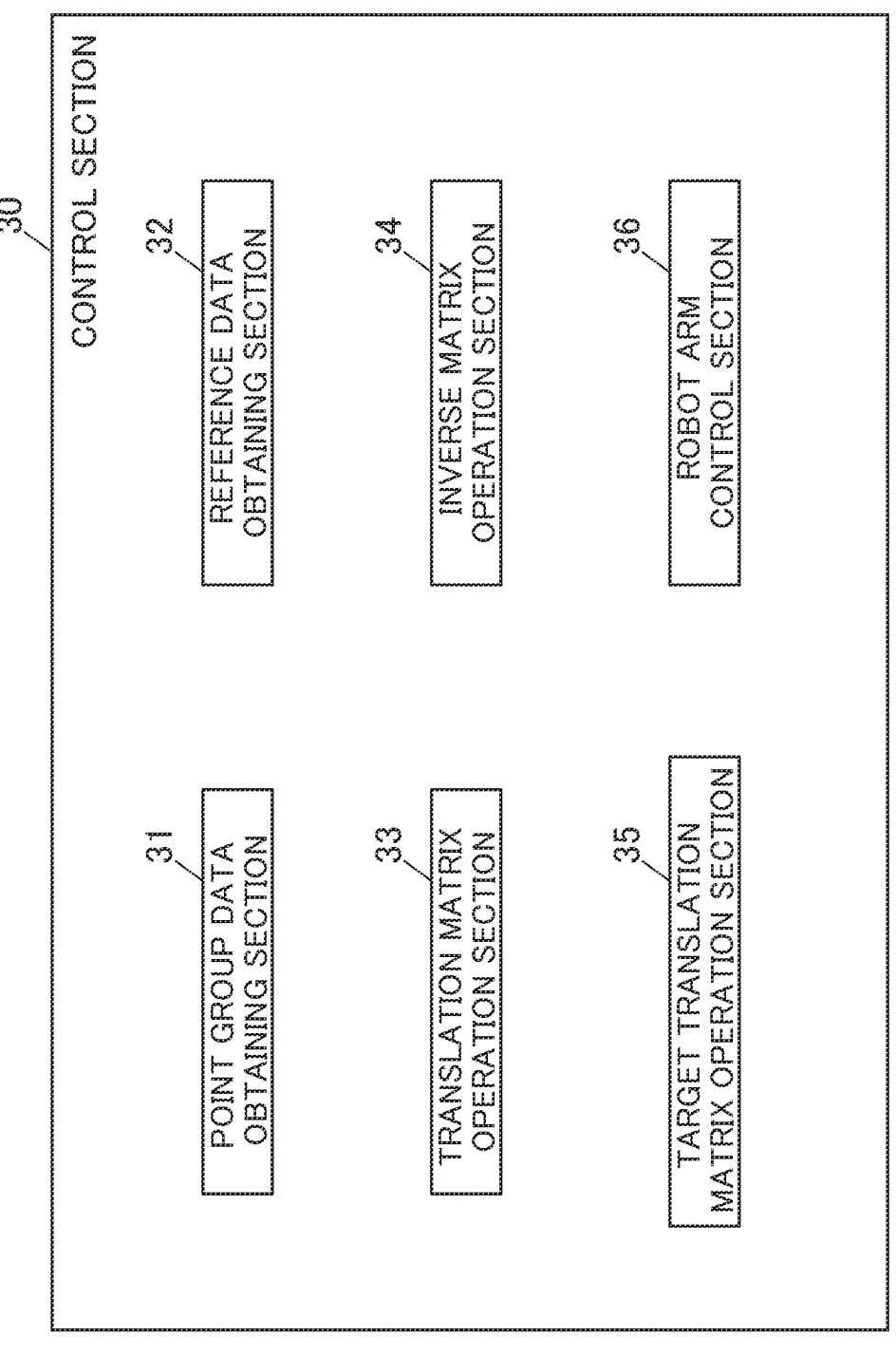
FIG. 9 is a view illustrating a third example of the configuration of the welding device of the vehicle parts to which the positioning device according to the present embodiment is applied.

FIG. 9 is a view illustrating a third example of the configuration of the welding device 1 of the vehicle parts to which the positioning device (positioning method) according to the present embodiment is applied. FIG. 9 exemplifies and shows functional components for executing motion (movement) control of the grip part 5 based on the above-described point group data, reference data and shape fitting point group data. Each functional component configures part of a control section 30 that is configured by a Central Processing Unit (CPU).

The control section 30 includes a point group data obtaining section 31, a reference data obtaining section 32, a translation matrix operation section (translation matrix calculating section) 33, an inverse matrix operation section (inverse matrix calculating section) 34, a target translation matrix operation section 35 and a robot arm control section 36.

The point group data obtaining section 31 obtains (receives an input of) point group data (three-dimensional information) of the upper sash 2 and the column sash 3 that uses the position information generation device as the origin by the position information generation device 20 and the 3D scanner 10.

The reference data obtaining section 32 obtains (stores) reference data (e.g., CAD data) that serves as a reference for design of the upper sash 2 and the column sash 3. This reference data can include an origin (such as a vehicle origin and, in this case, vehicle origin=position information generation device origin), and can be data of a position adjustment state of the upper sash 2 and the column sash 3.

The translation matrix operation section 33 calculates a translation matrix for adjusting the position of the point group data to the reference data in a position adjustment state of the upper sash 2 and the column sash 3. The shape fitting point group data obtained by adjusting the position of the point group data to the reference data based on the translation matrix is obtained by this translation matrix operation.

The inverse matrix operation section 34 performs inverse matrix transformation on 4×4 matrix data (matrix) that is calculated by the translation matrix operation section 33 and is used to match the point group data with the reference data. This transformation gives the origin to the above-described point group data (a state of the shape fitting point group data expressed as a reference data origin is expressed as a point group data origin). This scheme realizes giving CAD origin information to point group data without an origin.

For each of the upper sash 2 and the column sash 3, the target translation matrix operation section 35 can calculate a movement amount from the origin of at least one gripped workpiece (the column sash 3 in this case) of the upper sash 2 and the column sash 3 to the other one origin from a state where the origin (vehicle origin) is given by using the inverse matrix.

The robot arm control section 36 positions the upper sash 2 and the column sash 3 (the end part 3A of the column sash 3 and the end part 2A of the upper sash 2) by moving not only the grip part 5 but also the column sash 3 gripped by the grip part 5 by the robot arm part 6 based on at least one of the translation matrix and the inverse matrix. More specifically, the robot arm control section 36 causes, for example, each axis (six axes) of the robot arm part 6 to make a micromotion until the column sash 3 that is a positioning target arrives at a target position from an initial position or a current position based on at least one of the translation matrix and the inverse matrix. An instruction value of a micromotion amount at this time is a difference between a current position and a target position of the marker 40 (see FIG. 5) seen from the position information generation device 20. By setting a numerical value of this micromotion amount by coefficient adjustment or the number of times of micromotions, it is possible to perform positioning that does not depend on accuracy of the robot. That is, according to the present embodiment, at two stages of (1) movement of a workpiece (grip part) based on at least one of the translation matrix and the inverse matrix (e.g., movement from one of the origins added to the upper sash 2 and the column sash 3 to the other one origin based on one of these origins using the inverse matrix), and (2) movement of the workpiece (grip part) based on the marker 40 (correction positioning using the marker 40 or correction of an operation error in (1)), positioning of the workpieces (the upper sash 2 and the column sash 3) is executed. In a state where the robot arm control section 36 positions the end part 2A of the upper sash 2 and the end part 3A of the column sash 3, the welded parts (corner parts) Y of both of the end part 2A and the end part 3A are welded.

The function of the control section 30 can be also expressed as follows. That is, the control section 30 obtains three-dimensional data (e.g., point group data), and obtains relative position data (e.g., reference data) of a hand and workpieces. The control section 30 executes spatial positioning processing for fitting best the obtained three-dimensional data (e.g., point group data) and the relative position data (e.g., reference data). The control section 30 outputs a movement amount coordinate value of the workpieces by the hand. The control section 30 executes motion (movement) control of the hand and the workpieces by calculation of the six axes based on robot inverse kinetics.

Figure 10:
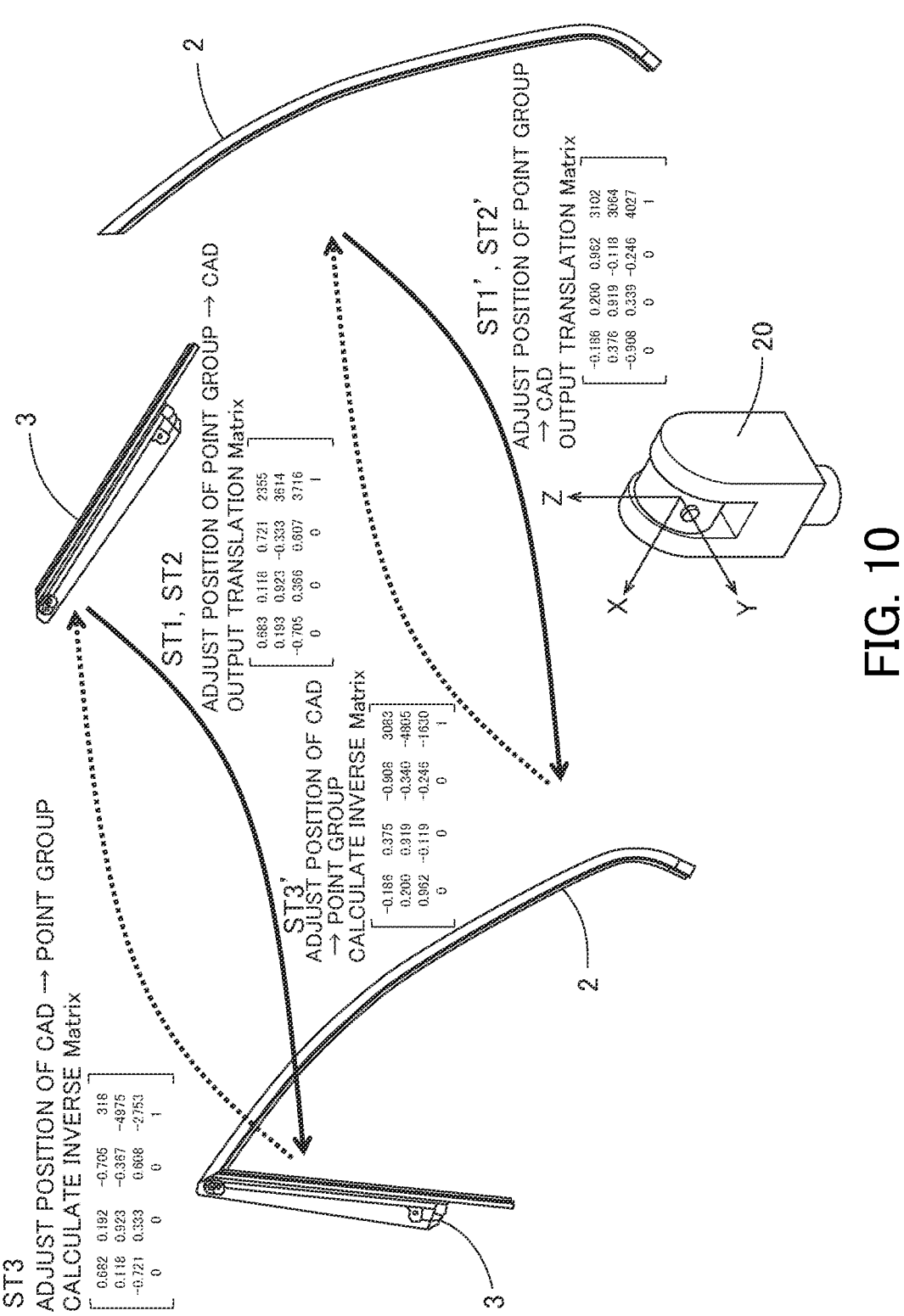
FIG. 10 is a view illustrating a first example of positioning processing according to the present embodiment.

FIG. 10 is a view illustrating a first example of positioning processing according to the present embodiment.

In step ST1, the position of the point group data of the column sash 3 is adjusted to the CAD data (reference data) and, in step ST2, a movement amount in step ST1 is output by a translation matrix that is 4×4 matrix data (matrix data). By this means, shape fitting point group data obtained by adjusting the position of the point group data to the reference data based on the translation matrix is obtained for the column sash 3.

In step ST1', the position of the point group data of the upper sash 2 is adjusted to the CAD data (reference data) and, in step ST2', a movement amount in step ST1' is output by a translation matrix that is the 4×4 matrix data (matrix data). By this means, shape fitting point group data obtained by adjusting the position of the point group data to the reference data based on the translation matrix is obtained for the upper sash 2.

In steps ST3 and ST3', an inverse matrix operation (inverse matrix operation) is executed from the translation matrices in steps ST2 and ST2' to give the origin to the point group data. That is, based on the one origin, the other origin is matched with the one origin. Alternatively, the shape fitting point group data may be moved to move the origin (vehicle origin) of the reference data together, and match the moved origins of the upper sash 2 and the column sash 3.

Figure 11:
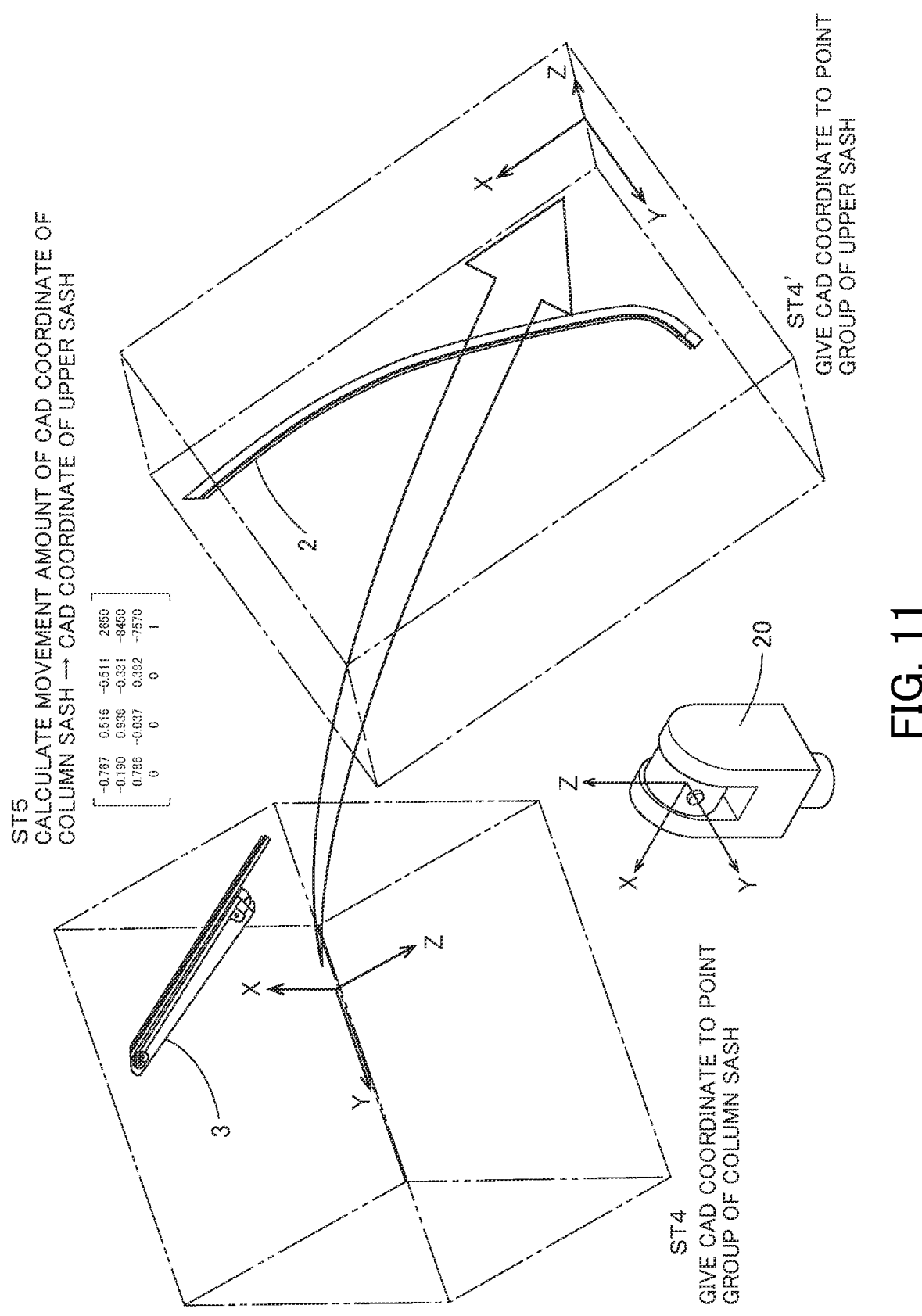
FIG. 11 is a view illustrating a second example of the positioning processing according to the present embodiment.

FIG. 11 is a view illustrating a second example of the positioning processing according to the present embodiment. In steps ST4 and ST4', the inverse matrices in steps ST3 and ST3' are used to give coordinate values (e.g., CAD coordinates) to the point group data of the upper sash 2 and the column sash 3. Furthermore, in step ST5, a movement amount of the point group data is calculated in a coordinate system whose origin (vehicle origin) is a reference, and the at least one gripped workpiece (the column sash 3 in this case) of the upper sash 2 and the column sash 3 is moved based on the calculated movement amount to position the upper sash 2 and the column sash 3. According to the present embodiment, the upper sash 2 is fixed, and the column sash 3 is movable, and therefore the movement amount corresponds to a movement amount of the column sash 3 with respect to the upper sash 2 (a movement amount from the CAD coordinate of the column sash 3 to the CAD coordinate of the upper sash 2).

The column sash 3 is relatively moved with respect to the upper sash 2 based on the movement amount of the upper sash 2 and the column sash 3 calculated in step ST5 (the movement amount of the column sash 3 with respect to the upper sash 2 in this case) to position the upper sash 2 and the column sash 3 (to adjust the positions of the end part 3A of the column sash 3 and the end part 2A of the upper sash 2).

Figure 12:
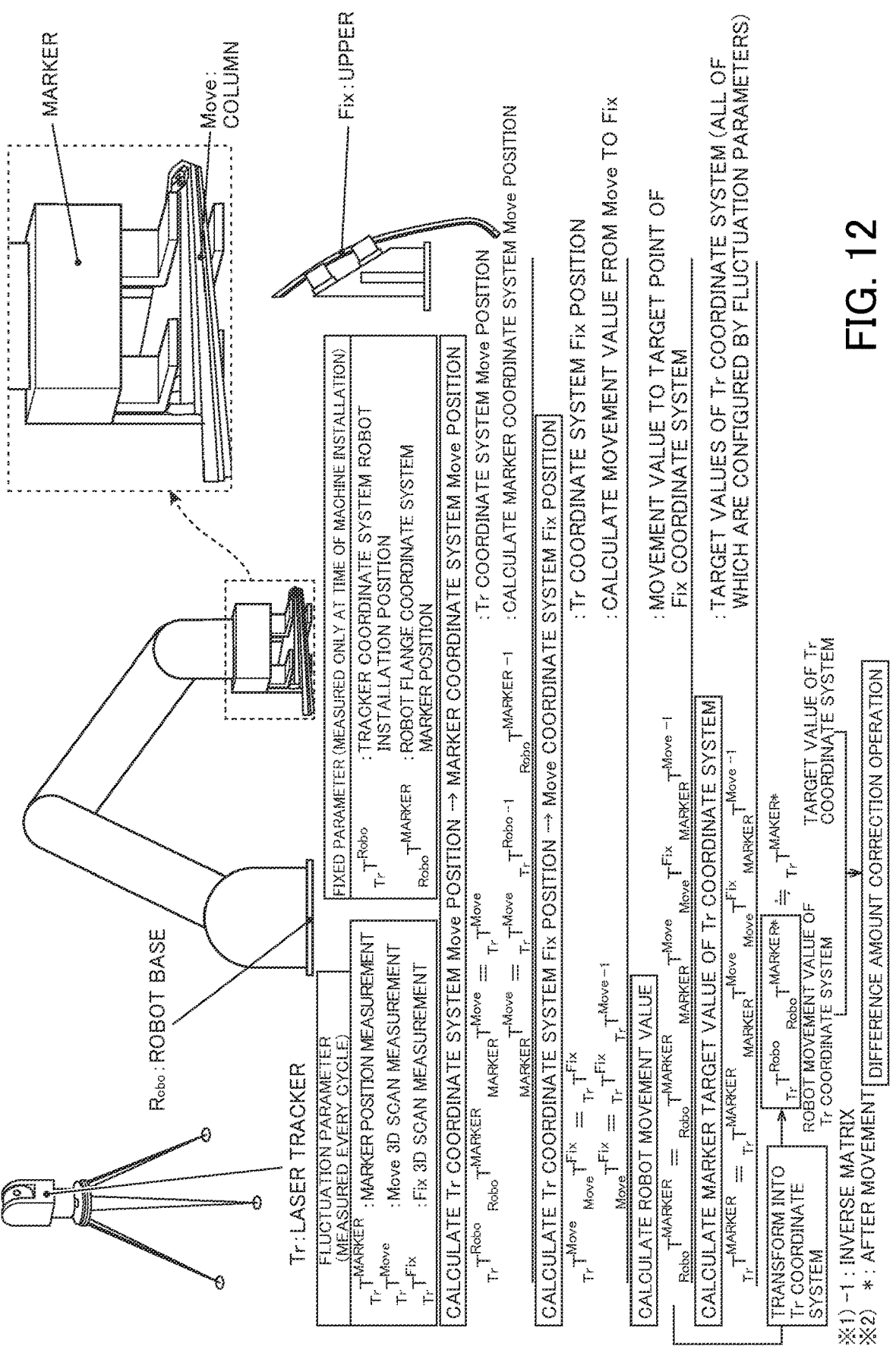
FIG. 12 is a view illustrating an example of a calculation summary in a case where a movement value and a target value are calculated from each matrix information (matrix data)

An example of a calculation summary in a case where a movement value and a target value are calculated from each matrix information (matrix data) will be described with reference to FIG. 12. FIG. 12 illustrates each matrix information obtained by measurement performed by the 3D scanner 10 and the laser tracker 20. In FIG. 12, Tr represents a laser tracker, Robo represents a robot, Fix represents an upper sash on a fixing side, Move represents a column sash on a movable side, and MARKER represents one component (marker) of a robot hand. Furthermore, a fluctuation parameter that is measured every time and a fixed parameter that is measured at a time of installation of a robot are each defined in each equation in FIG. 12. In each equation, "−1" means an inverse matrix, and "*" means a parameter after movement. When there is an operation error of the robot, it is possible to converge a position to a target position as much as possible by repeating correction based on each following equation. The operation is executed based on detection of the marker 40 (see FIG. 5) by the laser tracker 20. This correction scheme can correct thermal expansion, stretch and contraction of the robot arm due to an environment/continuous operation without depending on operation accuracy of the robot arm.

A process of adjusting a position of point group data to reference data according to the present embodiment includes, for example, a forced numerical value movement step of performing forced numerical value (quantitative value) movement on point group information, a best fit step for entire shape fitting of adjusting positions of an entire point group and an entire CAD shape, and a reference position adjustment step of performing detailed position adjustment to a reference part such as a part that serves as a reference for product evaluation.

Figure 13:
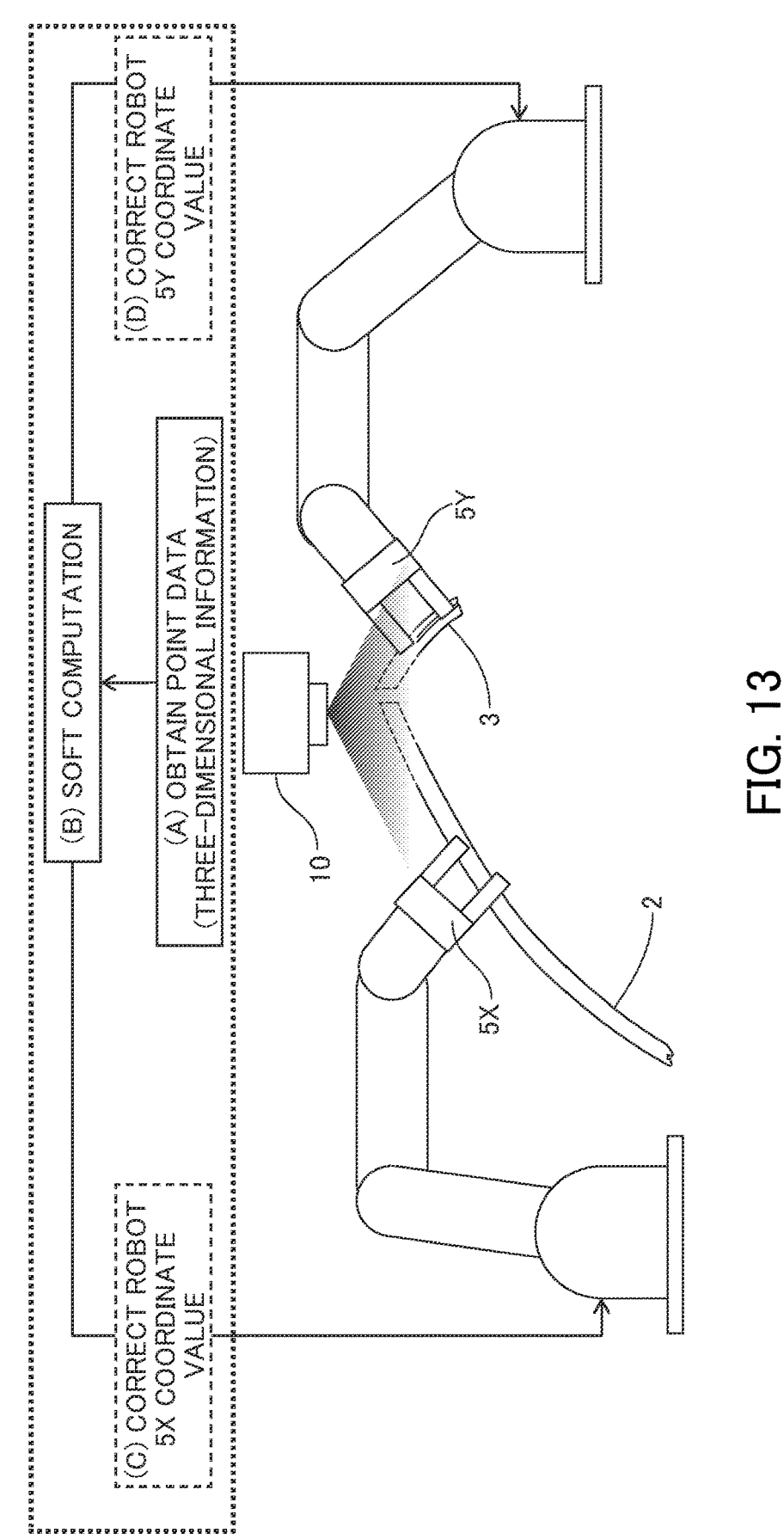
FIG. 13 is a view illustrating one example of the configuration of the welding device of the vehicle parts according to the modified embodiment.

FIG. 13 is a view illustrating one example of a configuration of a welding device 1' of vehicle parts according to a modified embodiment. In FIG. 13, the upper sash 2 is gripped by a grip part (arm robot) 5X, and the column sash 3 is gripped by a grip part (arm robot) 5Y. First, the 3D scanner 10 obtains point group data (three-dimensional information) of the grip part 5X and the upper sash 2 gripped by the grip part 5X, and the grip part 5Y and the column sash 3 gripped by the grip part 5Y (A). Next, a translation matrix for obtaining shape fitting point group data obtained by adjusting a position of point group data to reference data including an origin (vehicle origin), and an inverse matrix for moving origins (vehicle origins) of the shape fitting point group data and the reference data together (for matching the origins of the upper sash 2 and column sash 3) are calculated by soft computation (B). Furthermore, based on at least one of the translation matrix and the inverse matrix calculated by soft computation, a coordinate value of the grip part (arm robot) 5X is corrected (C), and a coordinate value of the grip part (arm robot) 5Y is corrected (D). Consequently, it is possible to position workpieces (the upper sash 2 and the column sash 3 in this case) without using a dedicated positioning mechanism (including a mold or a jig for positioning). That is, it is possible to position and weld the upper sash 2 and the column sash 3 by soft computation and the correction technique of the 3D scanner 10 and the laser tracker 20 while using general-purpose hands as the grip parts (arm robots) 5X and 5Y.

Figure 14:
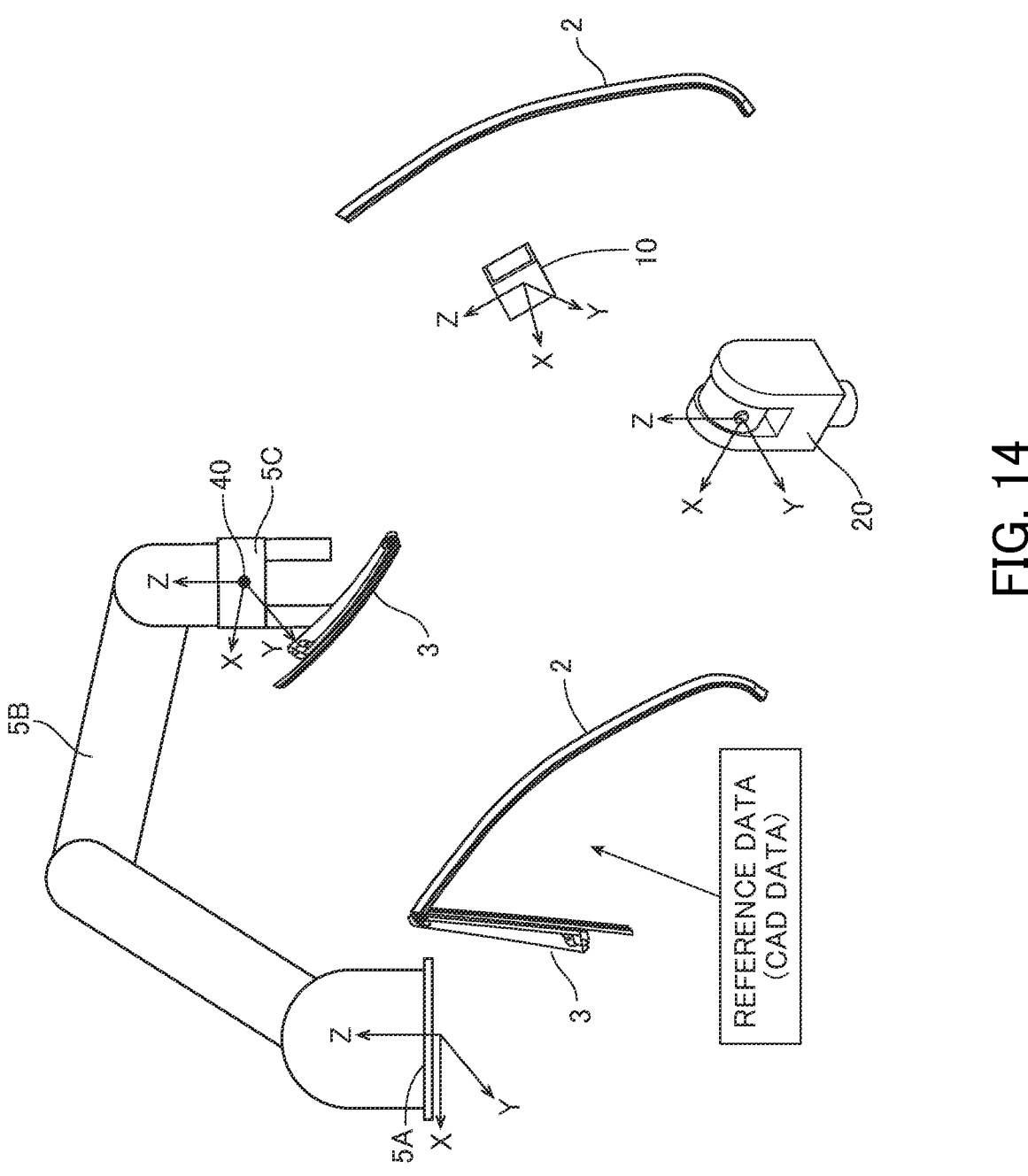
FIG. 14 is a view illustrating a first example of obtaining of various items of data that uses a position information generation device, and a position adjustment operation based on the obtained items of data.
Figure 15:
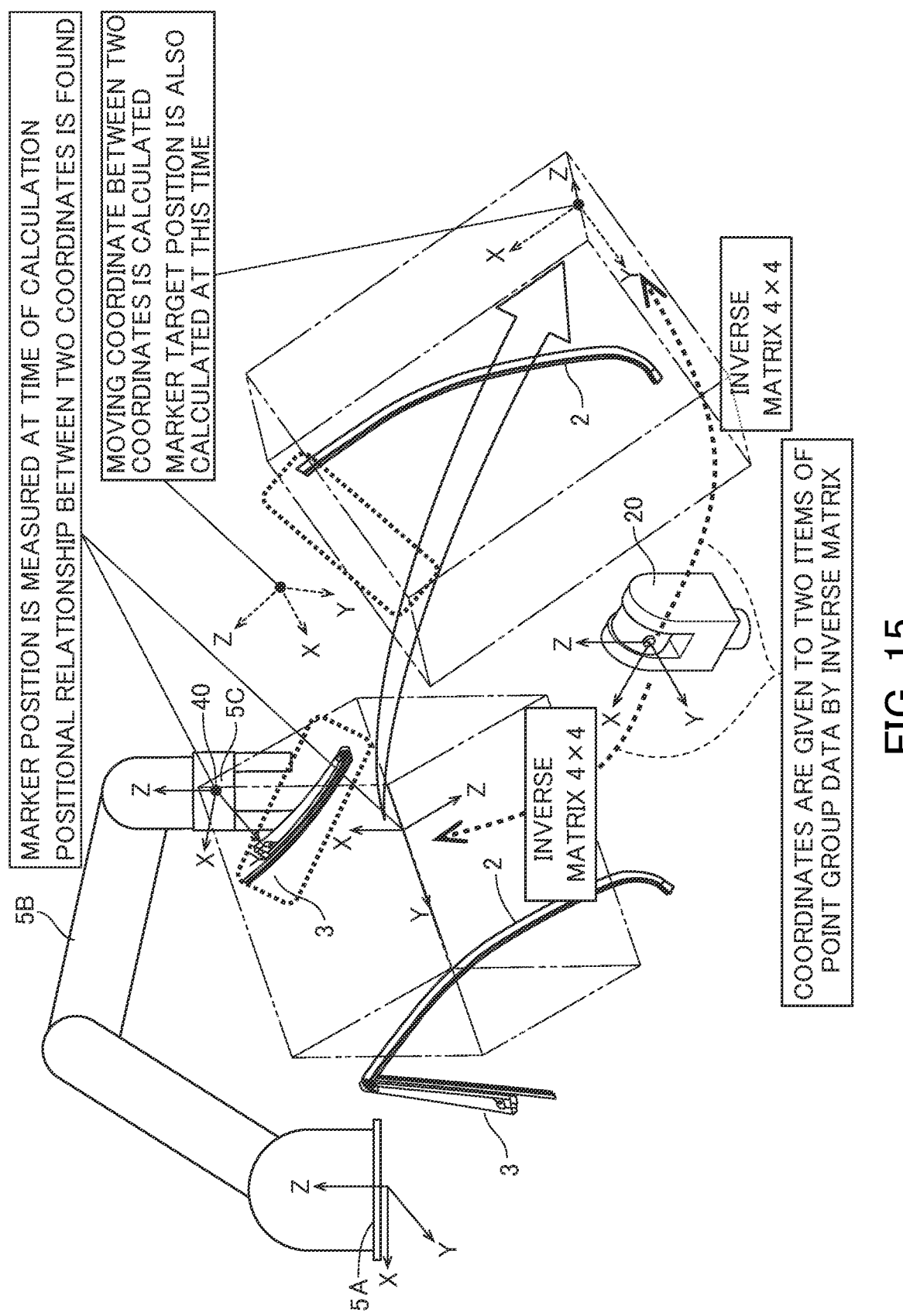
FIG. 15 is a view illustrating a second example of obtaining of the various items of data that uses the position information generation device, and the position adjustment operation based on the obtained items of data.

FIGS. 14, 15 and 16 are views illustrating first, second and third examples of obtaining of various items of data that uses the position information generation device 20, and a position adjustment operation based on the items of obtained data.

As illustrated in FIGS. 14 to 16, the arm robot includes a base part 5A that does not contribute to movement of a workpiece (the column sash 3 in this case), a movable arm part (robot arm part) 5B that contributes to movement of the workpiece (the column sash 3 in this case), and a grip part 5C that is provided at a distal end part of the movable arm part 5B. A position of the base part 5A is fixed at a time of installation of the arm robot. The movable arm part 5B is driven (e.g., six-axis driving) to move the workpiece (the column sash 3 in this case) gripped by the grip part 5C even after the arm robot is installed.

As illustrated in FIG. 14, at a time of installation of the arm robot, the position of the base part 5A of the arm robot is calculated (where an unmovable base part of the arm robot is is calculated) by initial measurement of the position information generation device 20. More specifically, for example, a planar part of the base part 5A of the arm robot is found by the touch probe with the marker (not illustrated) mounted on the position information generation device 20, then the movable arm part 5B of the arm robot whose arm robot distal end is attached with the marker 40 is repeatedly rotated, and the position of the marker 40 is measured to calculate a center coordinate of the base part 5A of the arm robot.

By monitoring (continuing tracking) the position of the 3D scan at all times at a time of 3D scan performed by the 3D scanner 10, the position information generation device 20 obtains point group data of the workpieces (the upper sash 2 and the column sash 3) (or assists the 3D scanner 10 to obtain point group data).

By monitoring (continuing tracking) at all times the position of the marker 40 provided at a distal end part of the movable arm part 5B of the arm robot at a time of the positioning operation, the position information generation device 20 assists positioning (micro driving) of the workpiece (the column sash 3) gripped by not only the movable arm part 5B but also the grip part 5C. The movable arm part 5B of the arm robot is calibrated in advance by the position information generation device 20 and the marker 40 to improve absolute accuracy in the spatial coordinate.

In FIG. 15, all initial states of the position information generation device 20, the 3D scanner 10, the reference data (CAD data) and the workpieces (the upper sash 2 and the column sash 3) are arranged in a common coordinate system of the position information generation device 20. More specifically, all of a coordinate system of the base part 5A of the arm robot, a coordinate system of the 3D scanner 10, a coordinate system of the position information generation device 20 and a coordinate system of the marker 40 illustrated in FIG. 15 are arranged in the common coordinate system (e.g., 4×4 matrix) of the position information generation device 20.

As illustrated in FIG. 15, coordinates are given to two items of point group data of the workpieces (the upper sash 2 and the column sash 3) by the inverse matrix (4×4) in the common coordinate system of the position information generation device 20. Furthermore, at least one origin is matched with the other one origin based on one of the origins. That is, a coordinate value is given to the shape fitting point group data by using the inverse matrix, a movement amount of the point group data is calculated in the coordinate system whose origin is the reference, and at least one (the column sash 3 in this case) of the workpieces (the upper sash 2 and the column sash 3) is moved based on the calculated movement amount to position the workpieces (the upper sash 2 and the column sash 3). In this regard, by measuring the position of the marker 40 at a time of calculation of the movement amount, a positional relationship between the coordinates of the workpieces (the upper sash 2 and the column sash 3) is found. Furthermore, when a moving coordinate between the two coordinates of the workpieces (the upper sash 2 and the column sash 3) is calculated, it is possible to calculate a target position of the marker 40, too.

As indicated in (A) in FIG. 16, following control is performed to operate (e.g., six-axis driving) the movable arm part 5B of the arm robot that grips the column sash 3 by the grip part 5C. That is, as indicated in (B) in FIG. 16, the position (current position) of the marker 40 after the operation of the movable arm part 5B of the arm robot that grips the column sash 3 is measured. Next, as indicated in (C) in FIG. 16, calculation of a difference between the position (current position) of the marker 40 after the operation of the movable arm part 5B of the arm robot that grips the column sash 3, and the target position of the marker 40 is executed by, for example, a 4×4 matrix. Furthermore, as indicated in (D) in FIG. 16, the difference (e.g., 4×4 matrix) between the position (current position) of the marker 40 after the operation calculated in (C) in FIG. 16, and the target position of the marker 40 is converted into a six-axis operation by inverse kinetics calculation, and output. Furthermore, a robot controller operates (e.g., six-axis driving) the movable arm part 5B of the arm robot. Thus, the operations in (A) to (D) in FIG. 16 are repeated until the difference between the position (current position) of the marker 40 after the operation and the target position of the marker 40 falls within the allowable value to improve absolute accuracy in the spatial coordinate of the robot.

As described above, the positioning device (welding devices 1 and 1') according to the present embodiment includes the grip part (5, 5X and 5Y), the point group data obtaining section (31), the translation matrix operation section (33), and the inverse matrix operation section (34). The grip part (5, 5X and 5Y) (executes a process that) grips at least one of the first and second workpieces (the upper sash 2 and the column sash 3). The point group data obtaining section (31) (executes a process that) obtains point group data of the at least one gripped workpiece of the first and second workpieces (the upper sash 2 and the column sash 3). The translation matrix operation section (33) (executes a process that) calculates the translation matrix of the shape fitting point group data obtained by adjusting the position of the point group data to the reference data in the position adjustment state of the first and second workpieces (the upper sash 2 and the column sash 3). The inverse matrix operation section (34) (executes a process that) calculates the inverse matrix based on the translation matrix. That is, the inverse matrix operation section (34) (executes a process that) calculates the inverse matrix of the shape fitting point group data obtained by adjusting the position of the point group data to the reference data based on the translation matrix. Furthermore, the positioning device (welding devices 1 and 1') according to the present embodiment (executes a process that) positions the first and second workpieces (the upper sash 2 and the column sash 3) when the grip part (5, 5X and 5Y) moves the at least one gripped workpiece of the first and second workpieces (the upper sash 2 and the column sash 3) based on at least one of the translation matrix and the inverse matrix under control of the robot arm control section 36.

Consequently, it is possible to position the workpieces (the upper sash 2 and the column sash 3) without using a dedicated positioning mechanism (including a mold and a jig for positioning). That is, it is possible to position the workpieces (the upper sash 2 and the column sash 3) by a simple method and configuration. In a case where other workpieces need to be positioned likewise, if there are two or more other target workpieces in addition to the positioning device, two or more hands (whose grip shape and grip accuracy do not matter) such as hands with suction pads that can grip the workpieces, one or more three-dimensional operation devices such as general arm robots that move the workpieces and the hands, and reference data such as CAD data, it is possible to generically position the workpieces based on workpiece shapes. In this regard, a mode that moves only one of the first and second workpieces (the upper sash 2 and the column sash 3) can reduce an error amount compared to a mode that moves both of the first and second workpieces (the upper sash 2 and the column sash 3), and therefore is advantageous. In addition, when, for example, the position information generation device 20 corrects (marker final position correction) the position of the grip part (a temporary general-purpose hand or the arm robot) based on detection of the marker 40, it is possible to further reduce the error amount.

Furthermore, (a process that executes) movement of the shape fitting point group data based on the inverse matrix, movement of the origin of the reference data together at a time of the movement, and matching of the moved origins of the first and second workpieces (the upper sash 2 and the column sash 3) are performed. Even this configuration can position the workpieces (the upper sash 2 and the column sash 3) by the simple method and configuration.

Furthermore, in the process of positioning the first and second workpieces (the upper sash 2 and the column sash 3), the origin is given to the point group data by using the inverse matrix, the movement amount for moving one origin of the origins of the first workpiece (upper sash 2) and the second workpiece (column sash 3) to the other one is calculated, and the at least one gripped workpiece of the first and second workpieces (the upper sash 2 and the column sash 3) is moved based on the calculated movement amount to position the first and second workpieces (the upper sash 2 and the column sash 3). Even this configuration can position the workpieces (the upper sash 2 and the column sash 3) by the simple method and configuration.

Furthermore, it is possible to (execute a process to) obtain the point group data that uses the position information generation device 20 as the origin by using the position information generation device 20 and the 3D scanner 10. That is, it is possible to obtain the shape fitting point group data obtained by adjusting the position of the point group data to the reference data including the origin by using the position information generation device 20. Even this configuration can position the workpieces (the upper sash 2 and the column sash 3) by the simple method and configuration.

When the point group data is matched with the reference data, it is possible to set a necessary number of arbitrary positions on the reference data as a reference, and set a priority to each set reference.

Furthermore, the grip part (5, 5X and 5Y) that grips at least one of the first and second workpieces (the upper sash 2 and the column sash 3) is configured as the arm robot that includes a plurality of axes (e.g., six axes), and the distal end part of the arm robot is provided with the marker 40 that makes it possible to monitor the position coordinate and the angle of the distal end part of the arm robot. Furthermore, the grip part can include the function of correcting the error of the difference between the current position and the target position of the marker at the distal end part of the arm robot by causing a plurality of axes of the arm robot to make multiple micromotions. These multiple micromotions can include the function that can set coefficient adjustment of the micromotion amount and the number of times of the micromotions. For example, the position information generation device 20 monitors the position and the posture of the marker 40 at all times, and outputs a misalignment amount of the target position and the posture to the arm robot to cause the arm robot to make a micromotion, so that it is possible to position the workpieces (the upper sash 2 and the column sash 3). Consequently, the absolute positioning accuracy of the arm robot improves. Furthermore, the position and the posture of the distal end part of the arm robot are corrected, so that there is an effect of reducing an influence of stretch and contraction of the arm robot due to a rise and a drop of a temperature, too (the marker 40 takes on a function of reducing the influence of stretch and contraction of the arm robot due to a rise and a drop of a temperature and detecting the arm robot).

Furthermore, according to the present embodiment, at two stages of (1) movement of the workpiece (grip part) based on at least one of the translation matrix and the inverse matrix (e.g., movement to the target position using the inverse matrix), and (2) movement of the workpiece (grip part) based on the marker 40 (correction positioning using the marker 40 or correction of an operation error in (1)), positioning of the workpieces (the upper sash 2 and the column sash 3) is executed. Even this configuration can position the workpieces (the upper sash 2 and the column sash 3) by the simple method and configuration.

The above embodiment has exemplified and described the case where the upper sash 2 corresponds to the "first workpiece" and the column sash 3 corresponds to the "second workpiece". However, how to set the "first workpiece" and the "second workpiece" has a degree of freedom, and various design changes can be made. For example, the column sash 3 may correspond to the "first workpiece", and the upper sash 2 may correspond to the "second workpiece". Alternatively, vehicle parts (such as a front frame, a rear frame, a mirror bracket and a lock reinforcement) other than the upper sash 2 and the column sash 3 may be the "first workpiece" and the "second workpiece". Furthermore, the "first workpiece" and the "second workpiece" are not limited to vehicle parts, and other various (arbitrary) positioning members may be the "first workpiece" and the "second workpiece". In this regard, the positioning method and the positioning device according to the present embodiment do not indispensably need to perform welding, and only need to position the "first workpiece" and the "second workpiece". Furthermore, a plurality of numbers of workpieces can be also set, and therefore are applicable to devices, too, that use positioning of a plurality of workpieces. That is, by securing necessary numbers of workpiece conveying devices and workpiece grip parts, the number of workpieces is not limited and has a degree of freedom.

The above embodiment has exemplified the case where the position information generation device 20 obtains the origin (vehicle origin). However, if there is the origin (vehicle origin) included in the reference data or information equivalent to the origin, the position information generation device 20 does not need to obtain the origin (vehicle origin) (the position information generation device 20 is not indispensable). Alternatively, at a time of installation of the arm robot, the position information generation device 20 may be removed after initial measurement for calculating the position of the base part 5A of the arm robot.

1, 1' WELDING DEVICE (POSITIONING DEVICE)
2 UPPER SASH (FIRST WORKPIECE)
3 COLUMN SASH (SECOND WORKPIECE)
4 FIXING JIG (SIMPLE JIG)
5, 5X, 5Y GRIP PART (TEMPORARY GENERAL-PURPOSE HAND, ARM ROBOT)
5A BASE PART
5B MOVABLE ARM PART (ROBOT ARM PART)
5C GRIP PART
6 ROBOT ARM PART
10 3D SCANNER WITH MARKER (CAMERA, POINT GROUP DATA OBTAINING SECTION)
20 POSITION INFORMATION GENERATION DEVICE (LASER TRACKER)
30 CONTROL SECTION (Central Processing Unit (CPU))
31 POINT GROUP DATA OBTAINING SECTION
32 REFERENCE DATA OBTAINING SECTION
33 TRANSLATION MATRIX OPERATION SECTION
34 INVERSE MATRIX OPERATION SECTION
35 TARGET TRANSLATION MATRIX OPERATION SECTION
36 ROBOT ARM CONTROL SECTION
40 MARK

What is claimed is:

1. A positioning method comprising:
gripping at least one of first and second workpieces;
obtaining point group data of the at least one gripped workpiece of the first and second workpieces, wherein the point group data refers to multiple points on the at least one gripped workpiece;
calculating a translation matrix of shape fitting point group data obtained by adjusting a position of the point group data to reference data in a position adjustment state of the first and second workpieces;
calculating an inverse matrix based on the translation matrix; and
positioning the first and second workpieces by moving the at least one gripped workpiece of the first and second workpieces based on at least one of the translation matrix and the inverse matrix, wherein the method further comprises moving the shape fitting point group data based on the inverse matrix, moving an origin of the reference data together at a time of the movement, and matching moved origins of the first and second workpieces.

2. The positioning method according to claim 1, wherein, in the positioning of the first and second workpieces, the first and second workpieces are positioned by giving an origin to the point group data by using the inverse matrix, calculating a movement amount for moving the one origin of the origins of the first workpiece and the second workpiece to the other origin, and moving the at least one gripped workpiece of the first and second workpieces based on the calculated movement amount.

3. The positioning method according to claim 1, further comprising obtaining the shape fitting point group data obtained by adjusting the position of the point group data to the reference data including the origin by using a central processing unit configured to calculate a translation matrix.

4. The positioning method according to claim 1, wherein, when the position of the point group data is adjusted to the reference data, a necessary number of arbitrary positions on the reference data can be set as a reference, and a priority can be set to each set reference.

5. The positioning method according to claim 1, wherein a grip part that grips at least one of the first and second workpieces is configured as an arm robot that includes a plurality of axes, and includes a distal end part provided with a marker that makes it possible to monitor a position coordinate and an angle of the distal end part of the arm robot, and
includes a function of correcting an error of a difference between a current position and a target position of the marker at the distal end part of the arm robot by causing the plurality of axes of the arm robot to make multiple micromotions.

6. The positioning method according to claim 5, wherein the multiple micromotions include a function that can set coefficient adjustment of a micromotion amount and a number of times of the micromotions.

7. The positioning method according to claim 1, wherein one of the first and second workpieces is an upper sash, and
the other one of the first and second workpieces is a column sash.

8. A positioning device comprising:
a robotic arm that grips at least one of first and second workpieces; and
a central processing unit, wherein the central processing unit is configured to perform operations including:
obtaining point group data of the at least one gripped workpiece of the first and second workpieces, wherein the point group data refers to multiple points on the at least one gripped workpiece;
calculating a translation matrix of shape fitting point group data obtained by adjusting a position of the point group data to reference data in a position adjustment state of the first and second workpieces; and
calculating an inverse matrix based on the translation matrix,
wherein the robotic arm positions the first and second workpieces by moving the at least one gripped workpiece of the first and second workpieces based on at least one of the translation matrix and the inverse matrix, and
wherein the central processing unit is configured to perform further operations including moving the shape fitting point group data based on the inverse matrix, moving an origin of the reference data together at a time of the movement, and matching moved origins of the first and second workpieces.

\* \* \* \* \*